US007715589B2

(12) United States Patent
Freeman et al.

(10) Patent No.: US 7,715,589 B2
(45) Date of Patent: May 11, 2010

(54) OCCLUDING CONTOUR DETECTION AND STORAGE FOR DIGITAL PHOTOGRAPHY

(75) Inventors: William T. Freeman, Acton, MA (US); Ce Liu, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1107 days.

(21) Appl. No.: 11/074,371

(22) Filed: Mar. 7, 2005

(65) Prior Publication Data

US 2006/0204040 A1 Sep. 14, 2006

(51) Int. Cl.
*G06K 9/00* (2006.01)
*G06K 9/40* (2006.01)

(52) U.S. Cl. .................. 382/103; 382/107; 382/254

(58) Field of Classification Search .......... 382/103, 382/107, 173, 254–275
See application file for complete search history.

(56) References Cited

U.S. PATENT DOCUMENTS

| 4,817,174 | A |   | 3/1989  | Nakatani           |         |
|-----------|---|---|---------|--------------------|---------|
| 5,170,440 | A |   | 12/1992 | Cox                |         |
| 5,259,040 | A | * | 11/1993 | Hanna              | 382/107 |
| 6,463,183 | B2| * | 10/2002 | Mizuno             | 382/282 |
| 6,654,507 | B2|   | 11/2003 | Luo                |         |
| 6,678,416 | B1| * | 1/2004  | Sun et al.         | 382/235 |
| 6,731,799 | B1| * | 5/2004  | Sun et al.         | 382/173 |
| 6,912,310 | B1| * | 6/2005  | Park et al.        | 382/199 |
| 7,239,719 | B2| * | 7/2007  | Bongiovanni et al. | 382/103 |
| 7,409,075 | B2| * | 8/2008  | Watanabe           | 382/103 |

OTHER PUBLICATIONS

Digital Still Cameras:Overview, Texas Instruments, http://focus.ti.com/lit/an/spra651/spra651.pdf.
Programmable DSP Platform for Still Cameras, Texas Instruments, Apr. 2000. Rabadi, et al., http://focus.ti.com/vf/docs/appsoverview.tsp?templateId=1010&path=templatedata/cm/overview/data/vidimg_digstillcam_ovw.
An Iterative Image Registration Technique With an Application to Stereo Vision, Lucas, et al., Proceedings of Imaging Understanding Workshop, 121-130 (1981).
The Laplacian Pyramid As a Compact Image Code, Burt et al., IEEE Transactions, vol. Com-31. No. 4, Apr. 1983.
Flash Photography Enhancement Via Instrinsic Relighting, Eisemann, et al. SIGGRAPH 2004, http://graphics.csail.mit.edu/~fredo/PUBLI/flash/flash.pdf.

(Continued)

*Primary Examiner*—Brian Q Le
(74) *Attorney, Agent, or Firm*—Muirhead and Saturnelli, LLC

(57) ABSTRACT

Described are techniques used in occluding contour detection. Cues obtained from a static image are combined with cues obtained based on motion disparity of objects in the image to determine occluding image contours. Two images of a same scene are obtained. Local pixel-wise flow fields are obtained using the Lucas-Kanade technique. A warped image is determined using the second image and the flow field. A disparity map is determined by comparing the warped image to the original first image. Static image cues are obtained from the original image using the Berkeley technique. The static image cues are combined with the motion disparity cues indicated by the disparity map producing a product image map. Occluding contours are determined by processing the product image map with the JetStream tracking technique. The occluding contours may be used with the original image for subsequent processing.

29 Claims, 18 Drawing Sheets

OTHER PUBLICATIONS

Digital Photography With Flash and No-Flash Image Pairs, Petschnigg et al., Proceedings of SIGGRAPH 2004. http://research.microsoft.com/copyright/accept.asp?path=http://research.microsoft.com/projects/FlashNoFlash/flash_no_flash%20(web).pdf&pub=acm.

Non-Photorealistic Camera: Depth Edge Detection and Stylized Rendering Using Multiflash Imaging, Raskar et al., ftp://ftp.merl.com/pub/raskar/NPR/.

Application Example: Color Image Enhancement, http://documents.wolfram.com/applications/digitalimage/UsersGuide/3.6.html.

S. Sclaroff and A. P. Pentland, "*Modal matching for correspondence and recognition*," IEEE Trans. Pattern Anal. Machine Intell., vol. 17, pp. 545-561, Jul. 1995.

Learning to Detect Natural Image Boundaries Using Local Brightness, Color and Texture Cues, Martin et al, IEEE Transactions on Pattern Analysis and Machine Intelligence, vol. 26, No. 5, May 2004.

Jetstream: Probabilistic Contour Extraction with Particles, Perez et al, http://research.microsoft.com/vision, Proc. Intl. Conf. On Computer Vision (ICCV), II:524-531, 2001.

Object-Based Image Editing, Barrett et al., SIGGRAPH, Jul. 2002.

Image-Based Modeling and Photo Editing, Oh, et al., SIGGRAPH, Jul. 2001.

Structural Saliency, Shashua, et al., 1988, IEEE, 321-327.

Steerable Filters and Local Analysis Image Structure, PhD Thesis, MIT 1992, William Freeman.

Statistical Models of Visual Shape and Motion, Blake et al., Proc. Roy. Soc. Lond. A, 356, 1283-1302, 1998.

Condensation—Conditional Density Propagation for Visual Tracking, Isard et al., Int. J. Computer Vision, 29(1):5-28, 1998.

Lucas Kanade 20 Years On: A Unifying Framework, Baker et al., Int. Journal of Computer Vision, vol. 56, No. 3, Mar. 2004, 221-255.

A Combined Corner and Edge Detector, Harris et al., Plessey Research Roke Manor, UK, 1988.

Image Warping with Scattered Data Interpolation, Ruprecht et al., IEEE Computer Graphics and Applications, 1995.

The Robust Estimation of Multiple Motions:Parametric and Piecewise-smooth Flow Fields, Computer Vision and Image Understanding, 63(a), 74-104, Jan. 1996.

Mixture Models for Optical Flow Computation, Proceeding of Computer Vision and Pattern Recognition, 760-761, Jun. 1993.

* cited by examiner

OCCLUDING CONTOUR DETECTION AND STORAGE FOR DIGITAL PHOTOGRAPHY

BACKGROUND

1. Technical Field

This application generally relates to computer vision and image processing, and more particularly to contour detection.

2. Description of Related Art

Images, such as those obtained in connection with taking a photograph, may be characterized as still or static images of a scene captured at a point in time. Such images may be recorded with a digital camera or other image capturing device. While a photograph is in the process of being composed in order to obtain a static image, components within the photograph may be subject to movement, such as by relative motion of objects in a scene. Also, depth information may be revealed due to parallax induced by small motions of an image capturing device, such as a camera, prior to recording the image. Information regarding the relative motion of objects of a scene are lost when the still image is recorded. Such information about the relative motion of objects in a scene may be useful in connection with processing the still image, such as to enhance the image.

Thus, it may be desirable to obtain and use information regarding the relative motion of one or more objects of a scene in connection with processing a static image, such as may be recorded in connection with taking a photograph. It may be desirable that such information be obtained using an efficient technique and stored in a space-efficient manner. It may also be desirable to use this information for in-camera image processing as well as off-camera image processing, such as in connection with image editing.

SUMMARY OF THE INVENTION

In accordance with one aspect of the invention is a method for determining occluding contours comprising: receiving a first image and a second image of a same scene at different points in time; determining motion disparity between said first image and said second image; determining static image information about said first image; and determining occluding contour information of said first image using said motion disparity and said static image information. The method may also include storing said occluding contour information with said first image. The occluding contour information may include a plurality of points corresponding to pixel locations of said first image. The occluding contour information may include an equation produced by a curve fitting process in accordance with a plurality of occluding contour points. The method may also include using said occluding contour information in at least one of: image enhancement or image editing. The contour information may be used in performing a non-interactive image operation on said first image. The contour information may be used in performing an interactive image operation in said first image. The method may also include: combining said static image information and said motion disparity into a product; and tracking occluding contours of said product to produce said occluding contour information. The method may also include: determining a flow field representing the motion disparity between said first image and said second image; warping said second image in accordance with said flow field to a warped image; and determining a disparity map by comparing said warped image with said first image. The static information may include at least one of: color, texture and brightness. The method may also include: determining a pixel in said product having a maximum intensity; using said pixel as a starting point to track a contour; removing said contour from said product producing a remaining product; and repetitively determining other contours from said remaining product until a threshold intensity of said product is reached. The method may also include: determining a plurality of paths from said starting point; and determining said contour in accordance with an average of said plurality of paths. The method may also include: receiving a second set of occluding contour information determined using a third image of said same scene; determining final occluding contour information by combining said occluding contour with said second set of occluding contour information; and storing said final occluding contour information with said first image.

In accordance with another aspect of the invention is a camera comprising: a first component that receives a first image and a second image of a same scene at different points in time; a second component that determines occluding contour information of said first image using motion disparity between said first image and said second image; and a third component that stores said occluding contour information with said first image. The occluding contour information may be determined using static image information about said first image. The camera may include a fourth component that uses said occluding contour information for performing an image enhancement.

In accordance with yet another aspect of the invention is a computer program product for determining occluding contours comprising code that: receives a first image and a second image of a same scene at different points in time; determines motion disparity between said first image and said second image; determines static image information about said first image; and determines occluding contour information of said first image using said motion disparity and said static image information. The computer program product may also include code that stores said occluding contour information with said first image. The occluding contour information may include an equation produced by a curve fitting process in accordance with a plurality of occluding contour points. The computer program product may also include code that uses said occluding contour information in at least one of: image enhancement or image editing. The computer program product may also include code that determines a flow field representing the motion disparity between said first image and said second image; warps said second image in accordance with said flow field to a warped image; and determines a disparity map by comparing said warped image with said first image.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
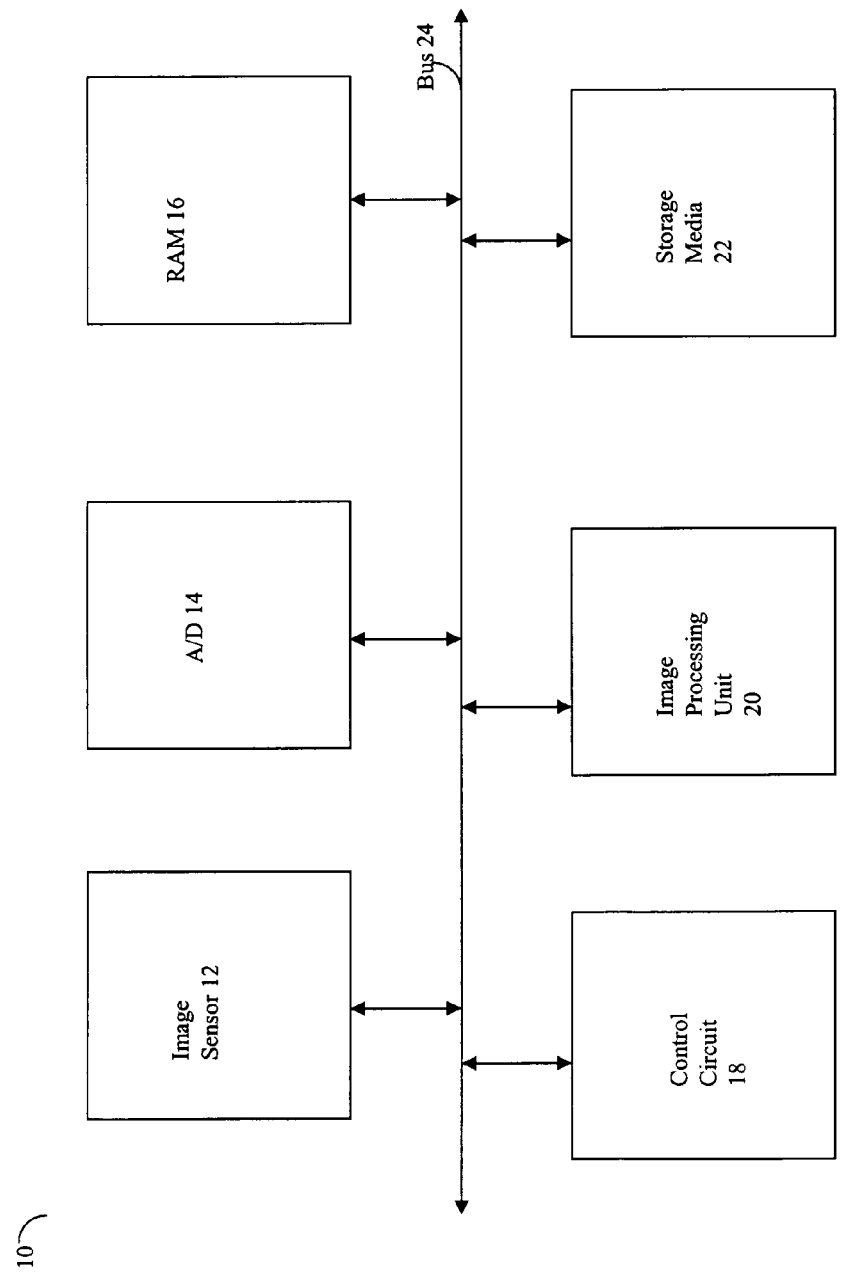
FIG. 1 is an example of a block diagram of an embodiment of a digital camera.

Referring now to FIG. 1, shown is an example 10 of a block diagram of components that may be included in an embodiment of a digital camera. It should be noted that an embodiment of FIG. 1 may include other components than as illustrated and described herein. Included in the digital camera 10 is an image sensor 12, an analog to digital (A/D) converter 14, random access memory (RAM) 16, control circuit 18, image processing unit 20 and storage media 22. The foregoing components may communicate with each other, and additional components that may be included in an embodiment, using a bus 24. An embodiment may include one or more additional, or different, communication mediums other than the bus 24 to facilitate communication among the different components of the digital camera 10.

In the digital camera 10 of FIG. 1, incoming light is received by image sensor 12. The incoming light may be received through a lens and aperture controlled by a camera shutter (not shown). The opening and closing of the camera shutter, as well as control signals causing the image sensor 12 to read charges from the sensor elements included therein, may be controlled by signals generated from the control circuit 18. The control circuit 18 may generate signals controlling the operation of the foregoing and other components in the digital camera 10. The image sensor 12 may include one or more image sensing or light receiving elements for image capture producing analog image signals proportional to the amount of light received. The image sensor 12 may include, for example, CMOS sensors, CCD sensors, and the like. The light receiving elements included in the image sensor 12 may constitute pixel values passed as input to the A/D converter 14. The A/D converter produces digital signals from the input analog signals. The digital output signals from the A/D converter 14 may be stored on a form of RAM 16 (e.g., such as dynamic RAM or DRAM), for processing by the image processing unit 20. The image processing unit 20 may be, for example, an ASIC (application specific integrated circuit). The image processing unit 20 may perform processing operations on the digital image signals such as, for example, interpolation, compression, decompression, and the like, that may vary with each embodiment. The RAM 16 may be used in storing intermediate results as used and/or produced by the image processing unit 20. The image processing unit 20 may also include a form of local memory therein for storing intermediate results in an embodiment. It should be noted that an embodiment may include other components than as described herein to perform computational tasks in processing the captured image data. Complete processing of the image data captured by the digital camera does not have to be performed by the image processing unit 20 as described herein for illustration purposes. For example, there may be multiple specialized components in an embodiment of a digital camera which collectively perform all image processing and capture. The particular component(s) may vary with embodiment and processing performed. Other alternative embodiments and variations are possible as known to those of ordinary skill in the art. When processing of image data has been completed, such as by the image processing unit 20, the image data may be stored on a storage device or storage media 22. The storage media 22 may be any one or more different types of non-volatile storage and devices well-known to those of ordinary skill in the art such as, for example, memory or a disk capable of recording image data. The storage media may be internal or external with respect to the digital camera. The storage media may also be removable for use with other systems besides the digital camera.

The image processing unit 20 may include one or more processors that execute instructions for performing different image processing techniques such as those described in more detail elsewhere herein. Instructions may be executed by a processor included in the digital camera 10 to perform a variety of different operations. Instructions and/or data may be stored on a data storage device, ROM, PROM, or other form of media, memory, or storage. As known in the art, executable code may be produced, for example, using a linker, a language processor, and other tools that may vary in accordance with each embodiment.

It should be noted that the techniques described herein may be performed using any one or more different digital cameras with in-camera processing components such as the image processing unit 20. An embodiment may also use other image capturing device(s), such as a portable PC camera, which may also include an image processing unit 20.

Figure 1A:
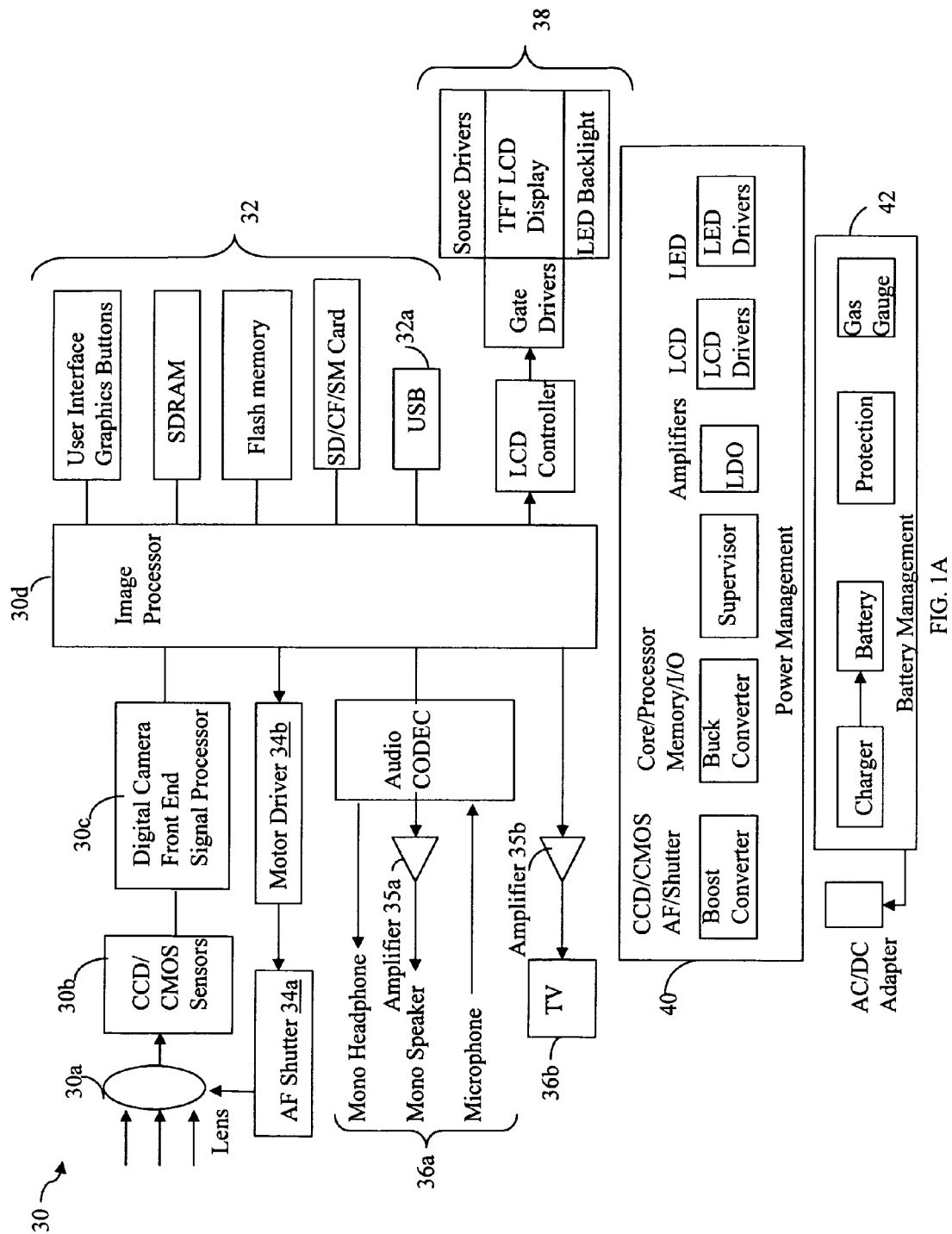
FIG. 1A is an example of another embodiment of a digital camera.

Referring now to FIG. 1A, shown is an example of another embodiment of a digital camera that may be used in connection with the techniques described herein. The embodiment 30 of FIG. 1A may be characterized as an example of components included in a digital still camera (DSC). DSCs are commercially available, for example, as produced by Texas Instruments and described, for example, at http://focus.ti.com/vf/docs/appsoverview.tsp?templateId=1010&path=templatedata/cm/overview/data/vidimg_digstillcam_ovw and at http://focus.ti.com/lit/an/spra651/spra651.pdf, describing a programmable digital signal processing platform for DSCs. The embodiment 30 includes a lens 30a through which light enters as controlled by the shutter 34a driven by the motor 34b. An image is captured by the CCD/CMOS sensors 30b. This raw image captured by 30b is processed by the digital camera front end signal processor 30c which may include, for example, an AD converter. The output of 30c is processed by the image processor 30d. The image processor 30d may perform functions including those as described in connection with the image processing unit 20 of FIG. 1. The image processor 30d may be connected to other components 32 which include different storage elements such as SDRAM and flash memory, inputs, such as user interface graphic buttons and a device connected via the USB port 32a, and the like. In this example 30, the image processor 30d may also include circuitry to control the motor driver 34b which controls the camera shutter 34a. The DSC example 30 may also include display components 38, for example, to provide for viewing of images. Any one of a variety of different I/O devices may also be connected to the DSC for video and/or audio. The DSC 30 may provide audio I/O for any one or more components included in 36a and/or 36b. An embodiment of the DSC 30 may also include power management components 40 and battery management components 42.

In one embodiment, the image processing unit 20 may also perform occluding contour detection processing using captured image data. Occluding contour detection may be performed to determine the occluding contours or boundaries of objects in a captured image. The foregoing contours may also be characterized as the outer edges of an object in front of a background. The occluding contour detection processing, as described in more detail in following paragraphs, uses a combination of cues obtained from static images and cues obtained from motion disparity to produce additional image data or "hints" as to where object boundaries or contours are within an original image. The motion disparity may be due to relative motion between objects as well as small parallax motion. The additional image data or "hints" may be referred to as occluding contour information. As will be appreciated by those of ordinary skill in the art and as also described elsewhere herein, the occluding contour information may be used in subsequent image enhancement and/or image editing performed in-camera and/or off-camera, such as with a computer system.

Figure 2:
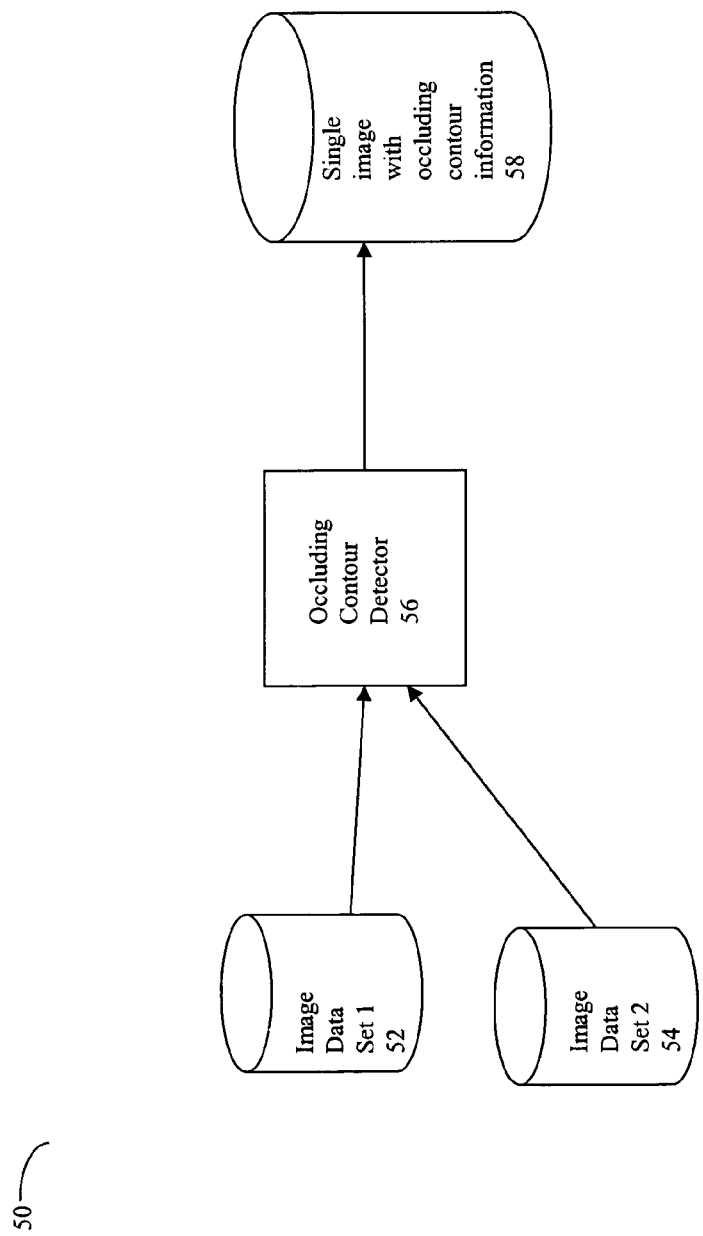
FIG. 2 is an example illustration of data flow between components in performing occluding contour detection.

Referring now to FIG. 2, shown is an example 50 illustrating data flow between components in connection with performing occluding contour detection using techniques described herein. Included in the example 50 is a first image data set 152, a second image data set 254, an occluding contour detector 56, and a single image with the occluding contour information 58. Both the image data sets 52 and 54 as well as the image data with occluding contour information 58 may be stored, for example, in memory, on storage devices, and the like, in a digital camera whose components are illustrated in connection with FIG. 1.

In one embodiment of a digital camera of FIG. 1, the processing described in the following paragraphs performed by the occluding contour detector 56 may be performed by the image processing unit 20. In another embodiment, the processing performed by the occluding contour detector 56 may be performed by another device or component. In one embodiment, the processing of the occluding contour detector 56 may alternatively be performed using a commercially available computer system as described elsewhere herein, for example, in connection with FIG. 9. The occluding contour detector 56 may produce as an output element 58 which includes an original single image, such as the first image data set 152, stored with the additional occluding contour information. Alternatively, an embodiment may store the occluding contour information separately from the associated or corresponding original image data.

Figure 3:
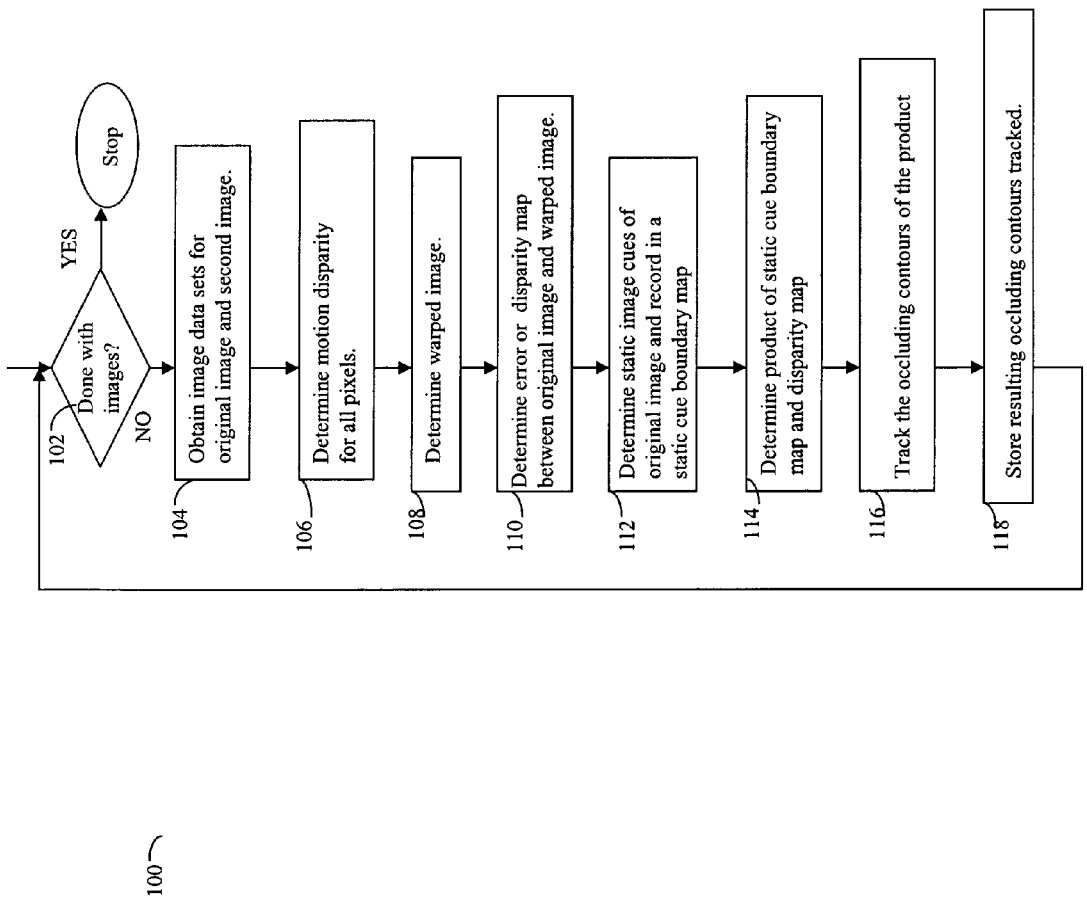
FIG. 3 is a flowchart of processing steps of one embodiment for performing occluding contour detection.

Referring now to FIG. 3, shown is a flowchart 100 of processing steps of one embodiment for performing occluding contour detection processing. It should be noted that the processing of flowchart 100 may be performed for pairs of image data sets in which each pair includes an original first image of a scene, and a second image of the same scene obtained at a subsequent point in time. The processing steps of flowchart 100 may be performed by the occluding contour detector 56 of FIG. 2. In a digital camera, the processing steps of flowchart 100 may be performed by the image processing unit 20 of FIG. 1.

At step 102, a determination is made as to whether processing is complete for all pairs of images. If so, processing stops. Otherwise, processing proceeds to step 104 to process the next pair of image data sets. At step 104, an original image and a second image are obtained. In connection with the digital camera of FIG. 1, for example, the image data sets may be captured when a user takes a photograph. In another embodiment, the image data sets may also be captured using different techniques. The image data sets used in flowchart 100 processing may have been previously obtained and stored at an earlier point in time to a data storage device. The image data sets may be retrieved from the data storage device for processing with flowchart 100.

It should be noted that the original first image and the second image are taken of a same scene at different points in time. Using the original image and the second image, motion information may be extracted and used in the occluding contour detection processing described herein. The second image may be stored temporarily, for example, in memory for processing. Subsequently, after the occluding contour information is obtained, the original image and the occluding contour information may be stored rather than, for example, storing both the first original image and the second image for later subsequent processing, such as image enhancement and/or editing. It should also be noted that the images obtained at step 104 may be gray scale images as well as color images. Although the techniques described herein may make reference to a gray scale image, one of ordinary skill in the art may easily adapt the techniques described herein for use with color images.

The image data sets obtained at step 104 may be two dimensional images containing data in the form of pixels with x,y coordinate values. An embodiment may also use data with a different number of dimensions than the two-dimensional data described herein. At step 106, motion disparity between the original and second images is determined. In one embodiment described in more detail in following paragraphs, the motion disparity may be measured by determining optical flow fields for all of the pixels in the original image. The optical flow fields may be determined using the Lucas-Kanade algorithm to compute a local pixel-wise flow field for all of the pixels in the original image. It should be noted that each of the steps described in flowchart 100 are described in more detail in following paragraphs and in connection with subsequent figures. In one embodiment, flow fields in step 106 measure the difference in position of each pixel with respect to the original image and the second image. An optical flow field for an image may be represented, for example, by x and y displacement values indicating a relative change in pixel location, respectively, in both the x and y directions of each pixel in the original image. At step 108, a warped image is determined. In one embodiment, this may be performed using the optical flow field and the second image. The warped image may be characterized as a computed version of the original image. The warped image may be determined by using any one of a variety of warping techniques on the second image which is warped in accordance with the optical flow field of the original image from step 106. The warped image ideally should be the same as the original or first image. However, there may be error in connection with measuring the motion disparity between objects in the original and second image. For example, there may be error in connection with determining the optical flow field with respect to all of the pixels in the original image. Thus, at step 110, an error or disparity map is determined between the original image and the warped image. At step 112, static image cues of the original image are determined and recorded in a static cue boundary map. The static cue boundary map may provide an indication as to which pixels of the original image may be included in an occluding contour or boundary. As will be described herein, an embodiment may use a probablistic-based technique, such as the Berkeley algorithm, which produces a pixel map based on static image cues. Each pixel in the original image has a corresponding probability represented as a real value between zero (0) and one (1) indicating a probability as to whether the corresponding pixel is on an occluding contour. It should be noted that other algorithms besides the Berkeley algorithm described herein may be used in connection with producing a static cue boundary map incorporating one or more different static image cues of the original image. At step 114, the product of the static cue boundary map and the disparity map are determined. Step 114 may be characterized as combining static image cues with motion based cues to produce a resulting product at step 114. Using this combined product, step 116 then tracks the occluding contours as determined as a result of the combination of static and non-static, or motion-based, cues. In one embodiment as will be described in following paragraphs, the occluding contours of the product may be tracked using the JetStream algorithm. The resulting tracked occluding contours may be stored at step 118. It should be noted that as described herein, the stored occluding contours may take one of several forms as described in more detail elsewhere herein. As a result of processing step 118, control proceeds to step 102 to determine if there are any additional original images to be processed. If there are no additional images to be processed, processing stops. Otherwise, control proceeds to step 104 to obtain the next original image data set and associated corresponding second image.

In connection with obtaining the pair of image data sets at step 104 in an embodiment of the digital camera, an original image may be captured in response to a user taking a picture causing, for example, a camera shutter to open and close on the camera. The digital camera may also obtain a second image automatically at a predetermined time period subsequent to obtaining the original image. In one embodiment using a digital camera, electronic shutters may be used to control the light and image capture for both images. A first image may be obtained in response to a user taking a picture. A second image may be captured at a predetermined amount of time following this. The second image capture may be performed automatically using the shutter that may be controlled using control circuitry included in the camera. The predetermined time may vary and may be, for example, a shortest amount of time a system needed to capture the second image. This time period between image capturing may be, for example, approximately 1/30 th of a second.

It should be noted that the occluding contour detection functionality and processing described herein may be enabled/disabled when embodied in a camera using, for example, an external camera setting such as obtained via a switch.

An embodiment may store the occluding contour information in addition to a single corresponding image, such as the first image used in the foregoing processing. The occluding contour information may be used in connection with subsequent processing of the corresponding image. Such subsequent processing may include, for example, image editing and enhancements described in more detail elsewhere herein and also known to those of ordinary skill in the art.

Figure 4A:
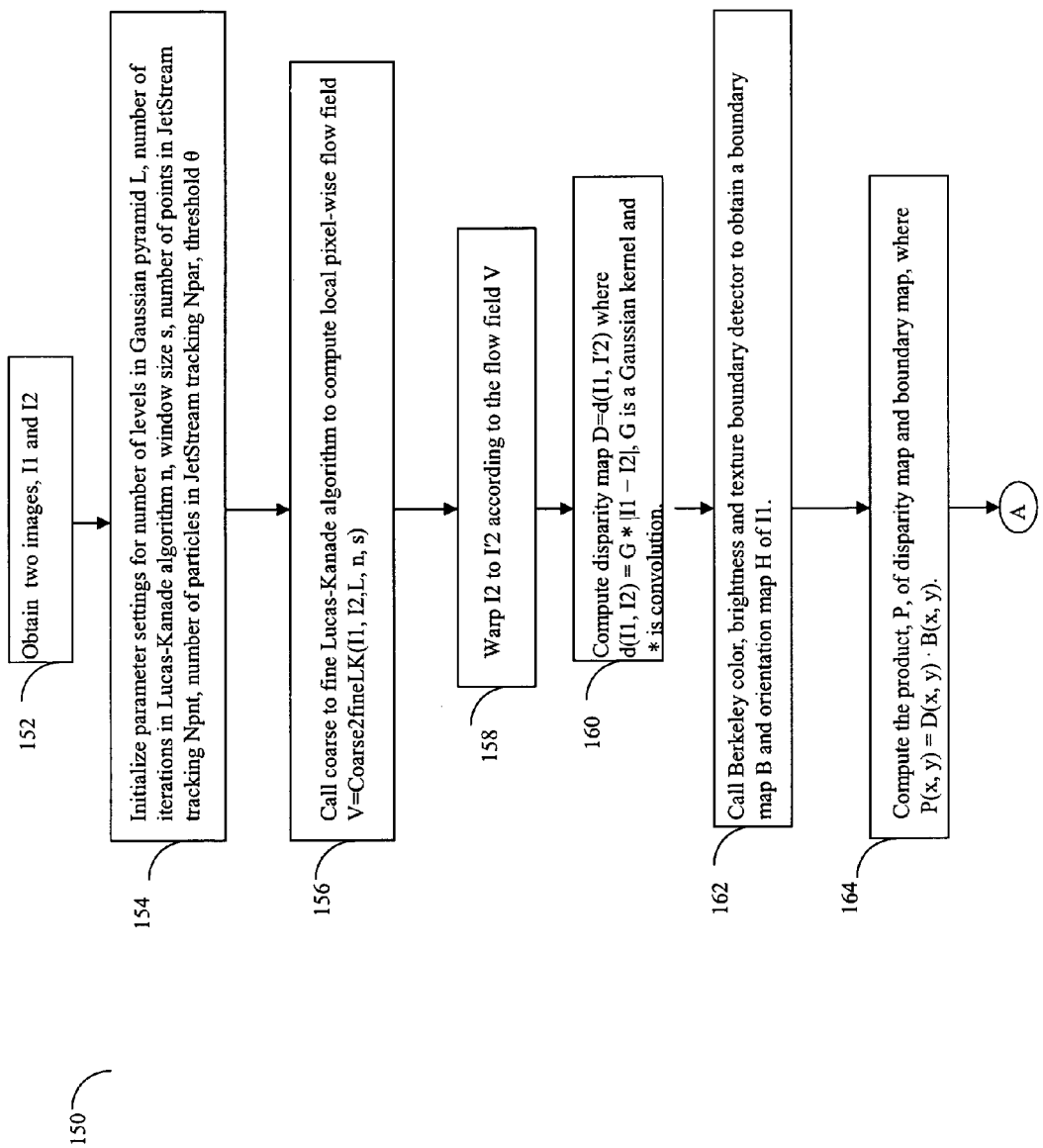
FIGS. 4A and 4B are flowcharts of processing steps of one embodiment for performing occluding contour detection.
Figure 4B:
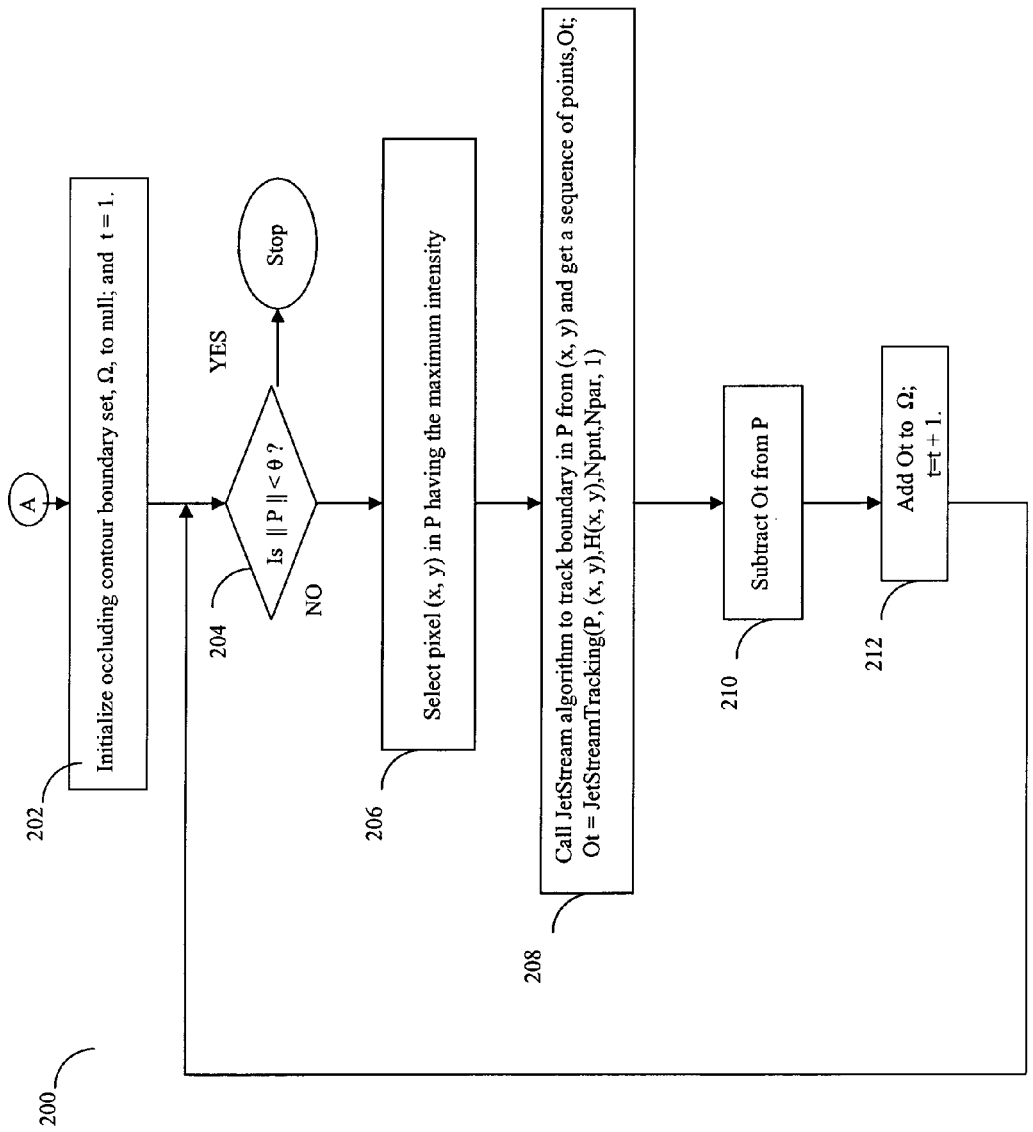

Referring now to FIGS. 4A and 4B, shown is a flowchart of processing steps that may be performed as part of occluding contour detection processing. It should be noted that the processing steps of FIGS. 4A and 4B describe in more detail the generalized steps of flowchart 100 of FIG. 3 that may be used in an embodiment. The processing steps of FIGS. 4A and 4B use particular techniques to determine the set of occluding contour points produced as an output. The first of the techniques used in the processing of FIGS. 4A and 4B is the Lucas-Kanade algorithm to find the optical flow field of the pixels of the original image. The Lucas-Kanade algorithm is described, for example, in S. Baker and I. Matthews, Lucas-Kanade 20 Years On: A Unifying Framework, *International Journal of Computer Vision,* 56(3):221-255, 2004, and B. Lucas and T. Kanade, An Iterative Image Registration Technique with an Application to Stereo Vision, *International Joint Conference on Artificial Intelligence*, pages 674-679, 1981. One embodiment of the Lucas-Kanade algorithm attempts to find a global transform from one image to another based on the assumption that images are derivable without occlusion. A variation of the original Lucas-Kanade algorithm may be used in an embodiment as described herein which determines a local pixel or a flow field for each of the pixels in the original image when the algorithm is applied to a local window around each original image pixel. In the embodiment described herein in more detail in the following paragraphs, a coarse to fine implementation based on Gaussian pyramid representation is used to further enhance the performance of the Lucas-Kanade algorithm. Other embodiments may use other variations and techniques than as described herein. An example of a coarse to fine implementation is described, for example, in *An Iterative Image Registration Technique with an Application to Stereo Vision*, Proceedings of Image Understanding Workshop, pages 121-130, 1981.

A second technique used in determining the occluding contours is image warping. Image warping is generally known to those of ordinary skill in the art and is described, for example, in J. Foley, A. Dam, S. Feiner and J. Hughes, *Computer Graphics Principles and Practice*, Second Edition, Addison-Wesley Publishing Company, p. 516-517, 1996. Image warping may be used in a particular embodiment as described herein in the Lucas-Kanade processing and also in determining the disparity of the flow fields as described, for example, at step 110 of FIG. 3. Different techniques for determining flow fields are described, for example, in Black, M. J. and Anandan, P., The Robust Estimation of Multiple Motions: Parametric and Piecewise-smooth Flow Fields, *Computer Vision and Image Understanding*, CVIU 63(1), p. 74-104, January 1996, and A. Jepson and M. J. Black, Mixture Models for Optical Flow Computation in *Proceedings of Computer Vision and Pattern Recognition*, p. 760-761, June 1993.

Figure 7:
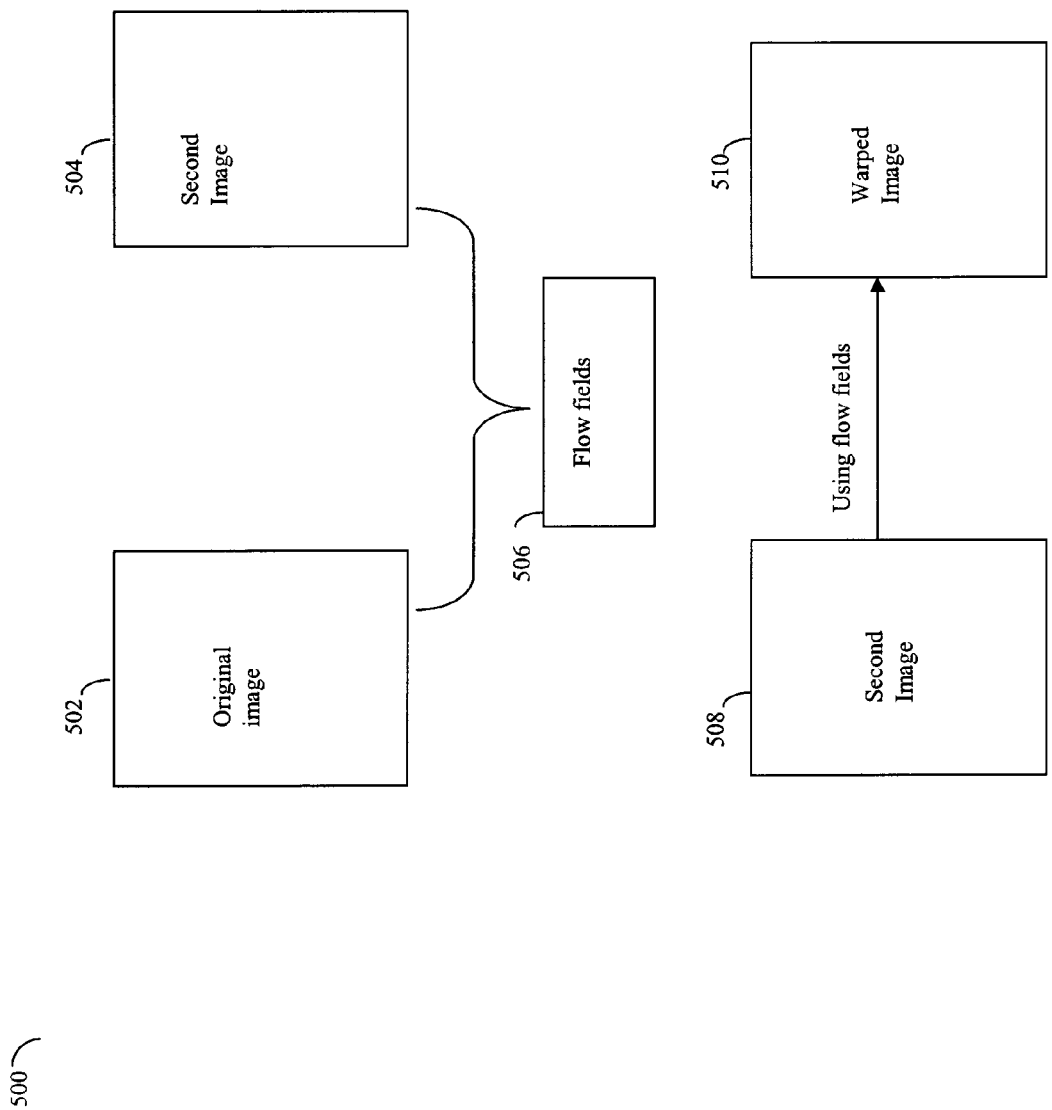
FIG. 7 is an example illustrating the use of flow fields in connection with some of the processing steps for determining occluding contours.

Referring now to FIG. 7, shown is an example illustrating the use of flow fields in connection with some of the processing steps for determining occluding contours with flow field disparity for motion cues. The flow field 506, as may be determined, for example, using the Lucas-Kanade algorithm, may be produced with respect to the original image 502 and a second image 504. The flow fields may measure, for example, the difference in displacement of a pixel x,y in the original image and where that same pixel is located in the second image 504. The optical flow fields may be produced in a pixel-wise fashion as an output 506. Using the flow field information from 506, the second image 504 may be warped to produce a warped image 510. This warped image 510 may then be compared to the original image 502 to determine the error or disparity map described, for example, at step 110. The flow field information 506 may represent the motion disparity for all of the pixels in the original image 502. Some of the occluding contours may be detected using motion cues determined in accordance with the disparity map produced from the foregoing optical flow fields and warped image. In one embodiment in connection with implementation of image warping, code may be developed in MATLAB. Within MATLAB is a function called interp2 which performs bicubic image warping based on a specified flow field input parameter. Accordingly, one embodiment may invoke this function in determining occluding contours detection to perform image warping where needed. It should be noted that other embodiments may use other techniques besides those described herein. The interp2 function is described, for example, at http://www.mathworks.com/access/helpdesk/help/techdoc/ref/interp2.html.

It should be noted that some occluding contours may not be detected using motion cues. Accordingly, other techniques as described herein may be used in determining occluding contours based on one or more static image cues. The techniques described herein combine both the occluding contours determined based on motion cues determined as motion disparity and static image cues.

Figure 8:
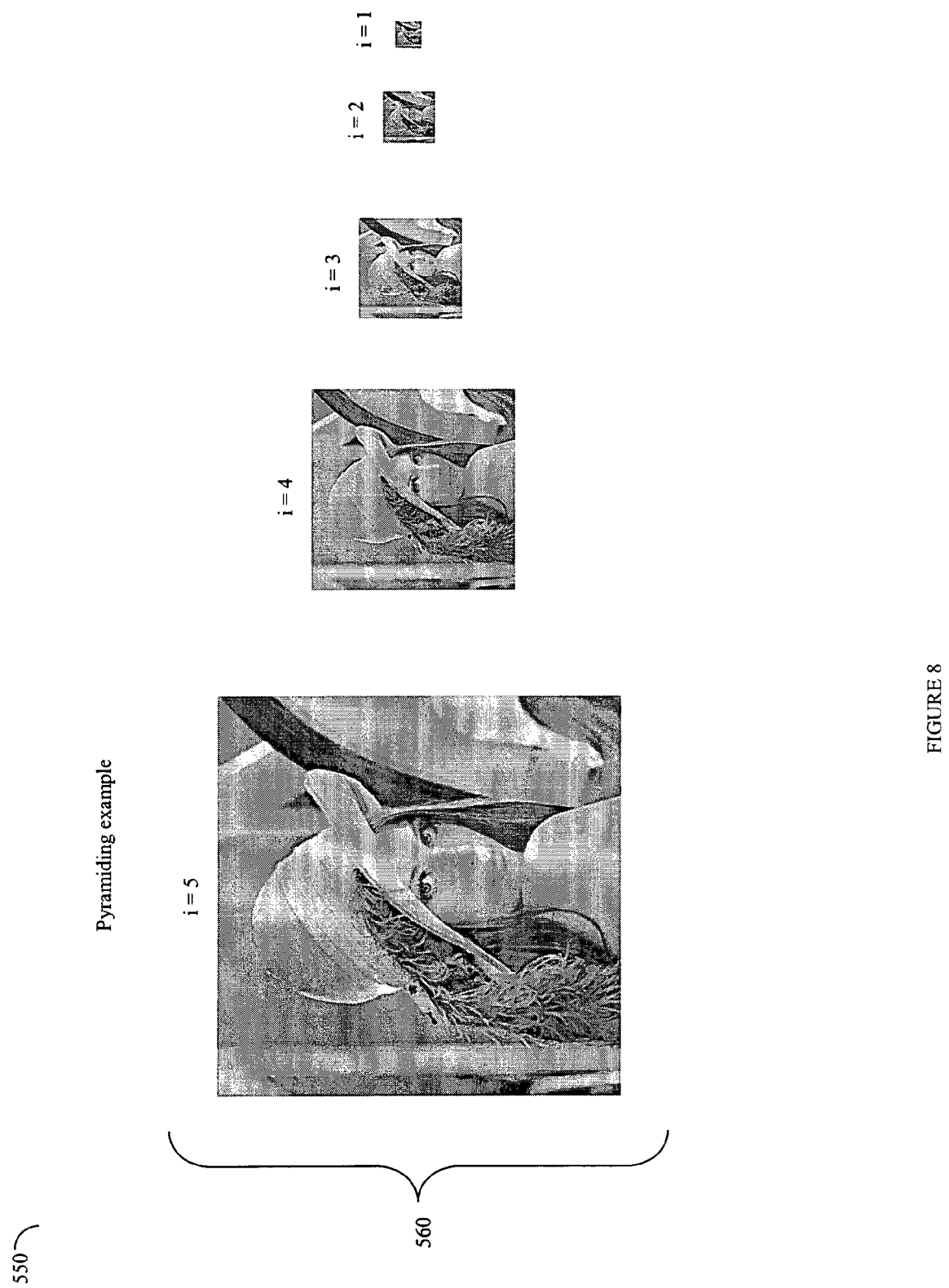
FIG. 8 is an example illustrating pyramiding as may be used in an embodiment of the Lucas-Kanade technique.

Referring now to FIG. 8, shown is an example 550 illustrating pyramiding as may be used in an embodiment of the Lucas-Kanade algorithm described elsewhere herein in more detail. As known to those of ordinary skill in the art, the pyramid with respect to imaging may be characterized as a collection 560 of representations of an image. Gaussian pyramids are described in, for example, P. J. Burt and E. H. Adelson, *The Laplacian pyramid as a compact image code*, IEEE Transactions on Communications, vol. com-31, no. 4, April 1983. In connection with the pyramiding technique described herein, each layer of the pyramid may represent an image which is, for example, half the width and half the height of a previous layer's image. It should be noted that other embodiments may use other proportions in connection with the layers of the associated pyramid. In a Gaussian pyramid, each layer is smoothed by a symmetric Gaussian kernel and resampled to get to a next subsequent layer. These pyramids may be more readily usable if the image dimensions are, for example, a power of 2 or a multiple of a power of 2. The smallest image, such as, for example, with i=1, is the most heavily smoothed. The layers of the pyramid are often referred to as coarse scale versions of the original image. The implementation of the embodiment of the Lucas-Kanade algorithm described herein makes use of the Gaussian pyramid of the original image and the second image when determining the optical flow field.

The processing described herein for determining occluding contours utilizes another technique, the Berkeley algorithm, based on static image cues. The Berkeley algorithm is described, for example, in Learning to Detect Natural Image Boundaries Using Local Brightness, Color, and Texture Cues, by David R. Martin, Chalress C. Fowlkes, and Jitendra Malik, *IEEE Transactions on Pattern Analysis and Machine Intelligence*, Vol. 26, No. 5, May 2004. The Berkeley algorithm uses color, texture, and brightness as static image cues in connection with determining occluding contours. An embodiment may use the Berkeley algorithm, for example, in connection with performing step 112 of FIG. 3.

In connection with implementation of the Berkeley algorithm, an embodiment described herein may use publicly available source code written in MATLAB from a Berkeley website http://www.cs.berkeley.edu/projects/vision/grouping/segbench/. The public source code is an implementation of the techniques described generally in the foregoing IEEE article.

Another technique that is used in the embodiment described herein for occluding contour detection is referred to as the JetStream algorithm. The JetStream algorithm may be used in performing the occluding contour tracking, for example, at step 116 of FIG. 3. The JetStream algorithm is described for example in JetStream: Probabilistic Contour Extraction with Particles, Patrick Perez, Andrew Blake, and Michel Gangnet, *International Conference on Computer Vision*, p. 524-531, July 2001. The JetStream algorithm was first designed to track edges in digital images. The general idea is borrowed from particle filtering, as described, for example, in M. Isard and A. Blake, Condensation—Conditional Density Propagation for Visual Tracking, *International Journal of Computer Vision*, 29(1):5-28, 1998, where a stochastic tracking framework is proposed. One advantage of using the JetStream technique is that it may be used to avoid being stuck at local minimums as compared to other edge tracking algorithms and techniques known to those of ordinary skill in the art.

Referring again to FIGS. 4A and 4B, processing steps of one embodiment of the occluding contour detection are described in more detail using the foregoing Lucas-Kanade algorithm, Berkeley algorithm, JetStream contour tracking algorithm, and image warping techniques just described. At step 152, two images, I1 and I2, are obtained. The images I1 and I2 represent two images of a same scene captured at different points in time. At step 154, various parameters may be initialized in connection with the various techniques used in this embodiment. For example, one or more variables may be initialized at this point in connection with the Lucas-Kanade algorithm, such as the number of levels in the Gaussian pyramids, L, the number of iterations used in the Lucas-Kanade algorithm implementation, n, the window size, s, and others that may be utilized in a particular embodiment. Each of these variables which have been initialized are described in more detail in the following paragraphs in connection with the particular embodiment of the Lucas-Kanade algorithm. Other variables that may be initialized at step 154 include variables used for the JetStream tracking algorithm such as the number of points to be tracked by the JetStream algorithm referred to as Npnt, the number of particles within the JetStream tracking algorithm, Npar, and a threshold, θ. Other embodiments may perform the initialization at this point or elsewhere as appropriate in connection with processing steps.

At step 156, the coarse to fine Lucas-Kanade algorithm is called to determine local pixel-wise flow fields for each of the pixels in the original image. Processing of step 156 is described elsewhere herein in more detail. As a result of the step 156 processing, returned is the flow field for the original image in a pixel-wise flow field representation in variable V. At step 158, the second image I2 is warped to a warped image represented as I'2 in accordance with the flow field V. At step 160, the disparity map, D, is determined. D may be represented as:

$$D = d(I1, I'2) = G * |I1 - I2|,$$

where:

G is a Gaussian kernel, and "*" represents the convolution operation.

It should be noted that the disparity map D may be determined by subtracting corresponding pixel values in the two images where the values are the pixel intensity. At step 162, the Berkeley algorithm may be invoked which determines a boundary map, B, and an orientation map, H, for the first image I1. The boundary map B produced using the public source code version described elsewhere herein returns a probability expressed as a continuous real value between 0 and 1, inclusively, which indicates a probability that a particular pixel in a position x,y within the boundary map is on an occluding boundary. The orientation map, H, includes an angular measurement between 0 and $2\pi$ that represents the orientation of the boundary going through the pixel. At step 164, the product, P, is computed for the disparity map D and the boundary map B determined from previous processing steps. The product P may be determined by multiplying the contents for each pixel x,y within D by the corresponding pixel location within the boundary map B producing a resulting product P.

Control proceeds to FIG. 4B, step 202, to perform initialization in connection with subsequent processing of occluding contour tracking. The flowchart 200 of FIG. 4B represents processing steps in an iterative fashion for tracking occluding contours within the product map, P, produced from step 164. At step 202, the occluding contour boundary set, $\Omega$, is initialized to null, and a loop control variable, t, used in the processing of flowchart 200 is initialized, t=1. At step 204, a determination is made as to whether $\|P\|$ is less than the specified value of the threshold, $\theta$. Note that $\|P\|$ may be determined as:

$$\|P\| = \Sigma_{x,y} P^2(x,y)$$

In this embodiment as represented above, $\|P\|$ represents the sum of each of the pixel values squared within the map P. When the summation for $\|P\|$ is less than a predefined threshold, processing stops. It should be noted that the particular threshold value of $\theta$ may vary in accordance with each embodiment. $\theta$ may be determined by empirical analysis of the input image or images. If it is determined that $\|P\|$ is not less than the predefined threshold $\theta$, control proceeds to step 206 where a single pixel x,y is selected from P having the maximum pixel intensity value. This maximum value is used by the JetStream algorithm invoked at step 208 as a starting point from which a boundary is tracked using the JetStream tracking techniques. From this starting point, a sequence of points is returned as the variable $O_t$.

The JetStream tracking technique described herein in more detail uses specific input parameters. The input parameters include the product P, a selected pixel x,y, from P having the maximum intensity as selected at step 206, the corresponding orientation from H for the selected pixel x,y, a number of points which are tracked (Npnt), a number of particles used within the tracking (Npar), and a step length of 1. It should be noted that the general technique of the JetStream tracking algorithm is to grow a series of paths from the starting point x,y. The number of paths or tracks grown from x,y is determined by the parameter Npar. Each of these paths is of a particular length which is denoted as the number specified in Npnt. Using these paths grown from the point x,y, a sequence of points associated with an occluding contour is returned as Ot. It should be noted that in one embodiment described herein, the number of particles represented as Npar is selected as 100. Other embodiments may use other techniques and values in tracking the occluding contours. In one embodiment, the value for Npnt is 100 although other values may be used in an embodiment than as described herein. In an embodiment, the JetStream algorithm may search to the boundary of an image and stop accordingly.

In connection with selection of the value for Npar may vary in accordance with the desired robustness of the tracking. However, it should be noted that selection of larger values of Npar also result in increases in computational complexity.

Once a sequence of points corresponding to an occluding contour has been returned by the JetStream tracking algorithm at step 208, control proceeds to step 210 where the sequence of points, Ot, is removed or subtracted from the product map P. In one embodiment, Ot may be subtracted from P using the following technique. First $O_t$ is displayed on a blank image where pixels on $O_t$ are 1, and all others are 0. This image may be referred to as $I_0$. This image $I_0$ is then blurred by a Gaussian kernel, G', and subtraction is performed by taking the maximum of:

$$\text{Max}(P - I_0 * G', 0).$$

In the foregoing, it should be noted that the "*" operator above with Max denotes a 2d convolution. An embodiment may use a standard MATLAB function, conv2, the implement this function. The image may be blurred using a Gaussian blur. Other embodiments may use other techniques than as described herein in accordance with the software and/or hardware that may b included in an embodiment.

Subsequently, control proceeds to step 212 where the sequence of points $O_t$ determined to be an occluding contour is added to the set $\Omega$, the occluding contour boundary set. t is incremented by 1, and control proceeds to step 204 to continue processing and produce another sequence of points until $\|P\|$ does not exceed the specified threshold, $\theta$, at step 204 causing processing of the flowchart 200 to stop.

It should be noted that in connection with processing steps described above and as referenced elsewhere herein:

w and h are integer values of the width and height, respectively, of the input images;
I1, I2, and D, B, and $P \in R^{w \times h}$;
V and $H \in R^{w \times h \times 2}$; and
$Ot \in R^{Npnt \times 2}$.

Figure 5:
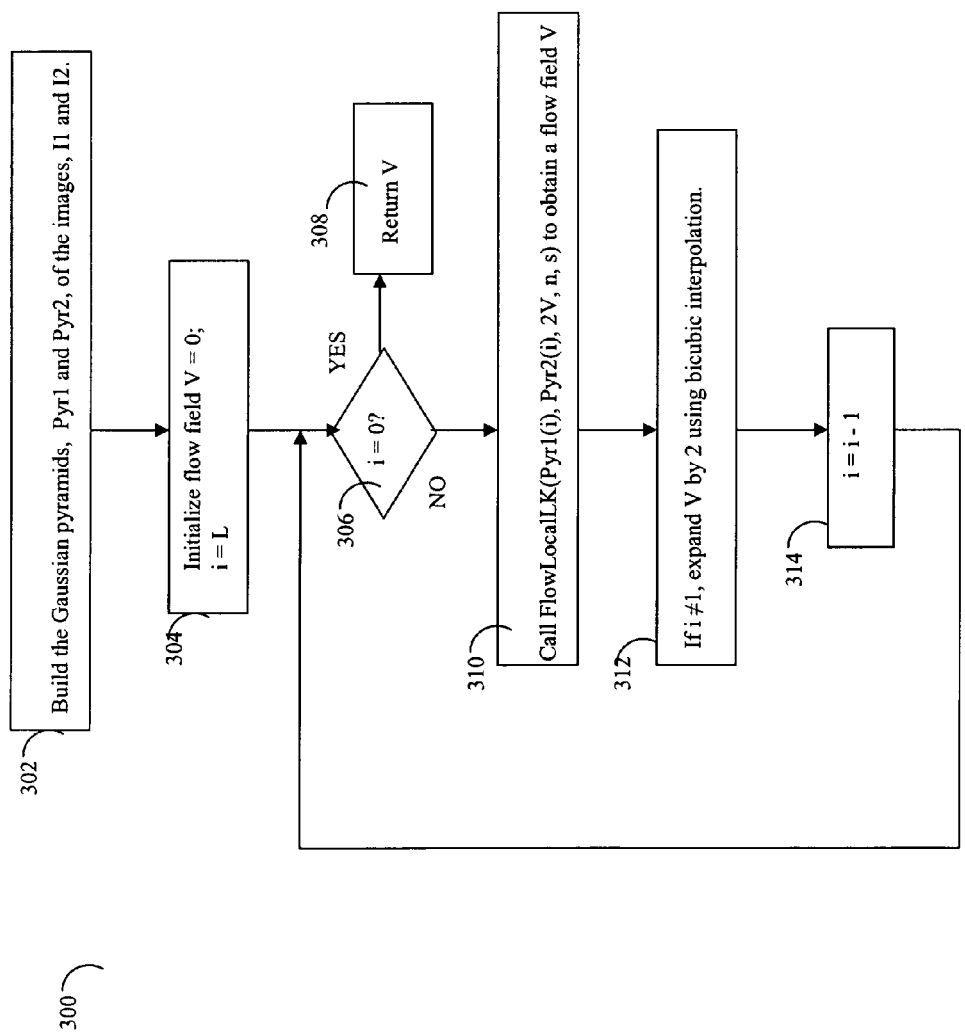
FIG. 5 is a flowchart of more detailed processing in flow field determination using an embodiment of the Lucas-Kanade technique.

Referring now to FIG. 5, shown is a flowchart of processing steps that may be included in an embodiment in determining the flow field with respect to the two input images, I1 and I2. It should be noted that the flowchart 300 of FIG. 5 may represent processing steps of one embodiment for the coarse to fine Lucas-Kanade (LK) routine invoked at step 156. It should also be noted that the input parameters specified in connection with the coarse to fine LK routine invocation at step 156 of FIG. 4A are used in the description of the flowchart 300 of FIG. 5. At step 302, the Gaussian pyramids, Pyr1 and Pyr2, of the images I1 and I2, respectively, are determined. It should be noted that the Gaussian pyramid is described in more detail elsewhere herein. In one embodiment, the Gaussian pyramids may be produced using a standard MATLAB function. Other embodiments may determine the pyramids for the images I1 and I2 using other techniques than as described herein and known to those of ordinary skill in the art. In this embodiment, the Lucas-Kanade technique uses a Gaussian pyramid of the input images I1 and I2 to calculate the relative disparity of the input images for use in determining the occluding contours.

At step 304, variables are initialized as used in connection with the processing of flowchart 300. In step 304 in this embodiment, the flow field V is initialized to zero and a loop control variable, i, is initialized to the value L. Recall that L, as described elsewhere herein, represents the number of levels within each of the pyramids Pyr1 and Pyr2. In this embodiment, L may be specified as a value, for example, such as 4 or 5. The number of iterations, n, of the algorithm may be selected as, for example, 3. It has been found through empirical testing that 3 is a number of iterations by which most of the flow field values converge. It should noted that as known to those of ordinary skill in the art, the technique described herein uses a fixed number of iterations (n) which specifies how many times the loop beginning at step 306 executes in determining the flow field. Rather than use a fixed number of iterations, an alternate embodiment may specify a threshold value representing a difference between subsequent error values determined at different points in time. This difference for an error function, e, representing a value at a first time, t, and a subsequent time or loop iteration, t+1, may be represented as $\|e(t)-e(t+1)\|$. The error function represents the image disparity. The number of iterations may be controlled by specifying a threshold value for the foregoing difference and continuing processing until the test at step 306 indicates that the foregoing error function difference is less than the specified threshold.

At step 306, a determination is made as to whether i is equal to zero. If i is equal to zero, it is an indication that processing has been completed for all of the levels of the pyramids for I1 and I2. Subsequently, if i is equal to zero, control proceeds to step 308 to return the computed flow field represented as the variable V in this embodiment. Otherwise, if i is not equal to zero, control proceeds to step 310 where the routine FlowLocal LK is invoked to obtain a flow field V. It should be noted that the routine invoked at step 310, FlowLocal LK, is used to provide an estimate of what is characterized as a localized flow field. Step 310 determines a localized flow vector for each pixel of a single level (i) within each of the Gaussian pyramids corresponding to images I1 and I2. Each subsequent loop iteration of step 306 uses a larger version, or a finer grain, of the images I1 and I2 from the Gaussian pyramids. The expansion of the flow field V is performed at step 312 if i is not equal to 1 meaning that processing is not at the lowest level of the pyramid with the coarsest image granularity. The expansion of V at step 312 may be performed using bicubic interpolation. An embodiment may perform this interpolation, for example, by invoking the MATLAB function interp2 as also described elsewhere herein. As described herein in one embodiment, the MATLAB function, interp2, may be used in connection with performing both bicubic interpolation and the interpolation processing of the flow field. Other embodiments may use other techniques in connection with performing this processing. At step 314, the loop control variable, i, is decremented by 1 and control proceeds to step 306 to determine a revised flow field in connection with the next level of the pyramid for each of the images I1 and I2.

It should be noted that the processing of step 310 is described in more detail in following paragraphs in connection with other figures.

The processing of flowchart 300 of FIG. 5 performs a coarse to fine Lucas-Kanade estimation of a local piece-wise flow field V. This technique does not find what may be characterized as the global affine transform. Rather, the technique used in this embodiment determines a flow field with a flow vector per pixel. As described above, the pyramids referred to as Pyr1 and Pyr2 at step 302 include all of the images within a single pyramid. The reference at step 310 to Pyr1 (i) and Pyr2 (i) refers to the ith image or level within the pyramid.

It should be noted that selection of a window size in this embodiment is an example of a more generally, well-known aperture problem. As known to those of ordinary skill in the art, the window size should be large to sufficiently constrain the solution while also being small enough to avoid violation of any assumptions, such as that the motion field is smooth. By empirical analysis, a window size of 3×3 pixels may be used. Other embodiments may also use other window sizes than as illustrated herein.

It should also be noted that the techniques described herein for flow field estimate assume every pixel in a first original image corresponds to the same pixel position in the second image. Based on the foregoing, a window is generated at each pixel to find a match in the other image. In other words, there is a dense flow field per pixel but this assumption does not hold on occluding boundaries since the occluded regions do not have corresponding pixels in the second image. Thus, the Lucas-Kanade algorithm is used to find the possible occluding regions because wherever the Lucas-Kanade algorithm fails to find a proper match for one pixel, it is likely that this pixel is located near an occluding boundary.

As described herein, pixel values may be represented as floating-point values. As also described herein, bicubic interpolation may be used in an embodiment. However, it should be noted that other interpolation techniques may be used in an embodiment such as, for example, bilinear interpolation, nearest neighbor and others known to those of ordinary skill in the art.

Figure 6A:
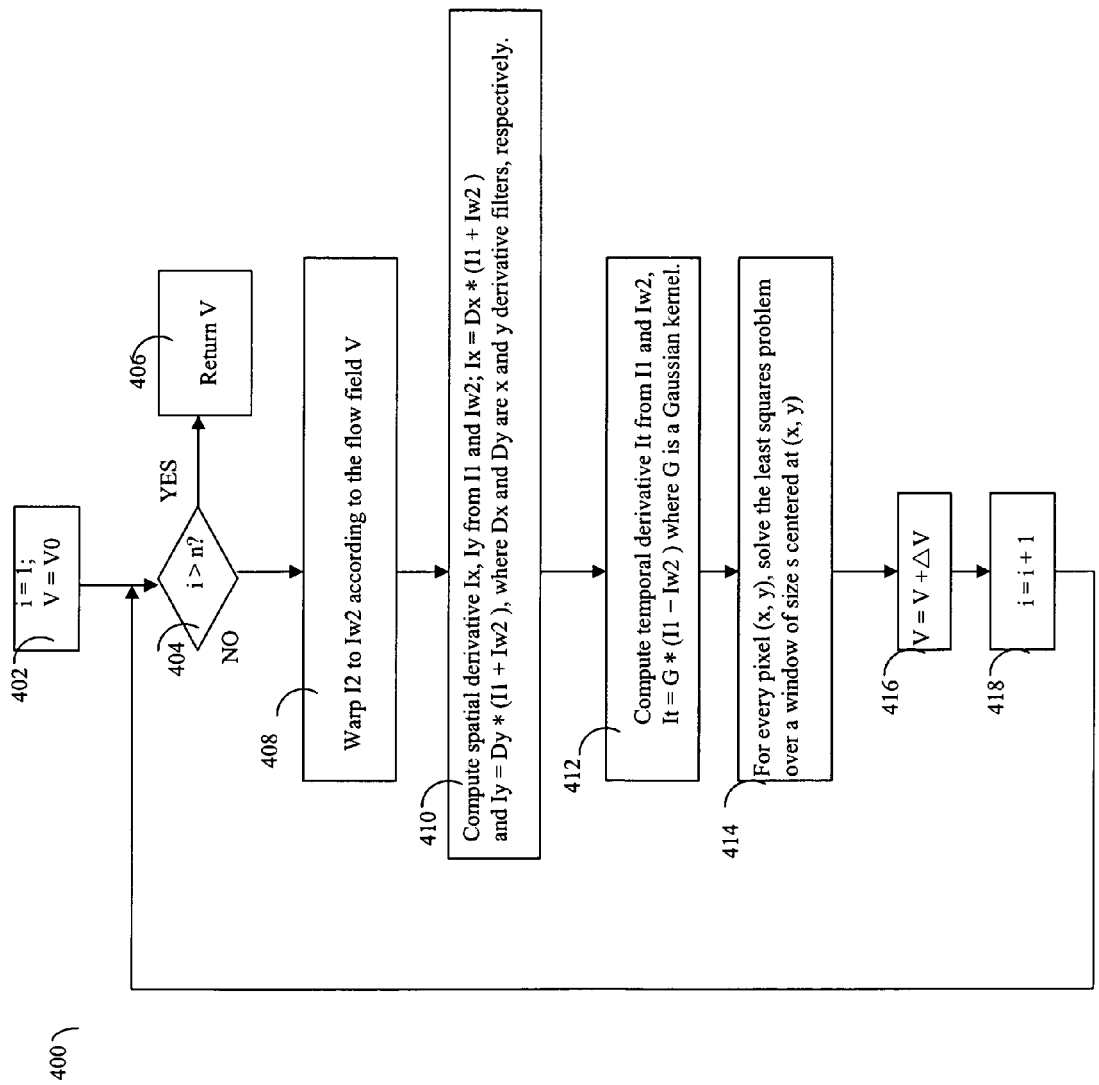
FIG. 6A is a flowchart of processing steps of one embodiment for estimating a localized flow field in connection with the Lucas-Kanade technique of FIG. 5.

Referring now to FIG. 6A, shown is a flowchart 400 of processing steps that may be performed in connection with processing of step 310 for the routine FlowLocal LK from step 310 of FIG. 5. The flowchart 400 details processing of one embodiment for providing an estimate of a localized flow field. At step 402, variables used within the processing of flowchart 400 are initialized. In this embodiment at step 402, a loop control variable i is initialized to the value of 1, and V is initialized to the value of V0, which is the input parameter or initial flow vector. At step 404, a determination is made as to whether i is greater than the value of n where n specifies the number of iterations to be performed by the loop at step 404 in estimating the localized flow field. In this embodiment as described elsewhere herein, n is specified as the value of 3. An embodiment may include other values than 3. If i is greater than the value of n, control proceeds to step 406 where the value of the localized flow field as represented in V is returned and processing of flowchart 400 stops. Otherwise, if step 404 determines that i is not greater than n, control proceeds to step 408 where the image I2 is warped to an image Iw2 according to the flow field V. As described elsewhere herein, image warping techniques may vary with each embodiment. In one embodiment, a MATLAB function may be invoked, such as the Interp2 function, to perform the warping at step 408.

At step 410, the spatial derivative, Ix and Iy, are determined from the images I1 and the warped imaged Iw2, Ix=Dx*(I1+Iw2) and Iy=Dy*(I1+Iw2) where Dx and Dy are x and y derivative filters, respectively. Dx and Dy are derivative filters. Using MATLAB notation, in one embodiment [−1, −1; 1 1]/4 and [−1, 1; −1]/4 are used as vertical (Dy) and horizontal (Dx) filters. Use of these filters and other techniques are known in the art as described, for example, in B. K. P. Horn's text book entitled "Robot Vision".

Control proceeds to step 412 where the temporal derivative, It, is determined using the original image I1 and the warped image of the second image I2 which is represented as Iw2. It may be represented as: It=G*(I1−Iw2).

At step 414, for every pixel x,y, the least squares problem is solved over a window of size s centered at the pixel x,y. It should be noted that at step 414, the following equation may be used to solve for $\Delta Vx$ and $\Delta Vy$ using standard techniques. In one embodiment, the least square problem may be solved by linear regression using MATLAB function (A\b) to solve the least square problem of Ax=b. Other embodiments may use other techniques than as described herein and known in the art.

$$\begin{bmatrix} \sum I_x^2 & \sum IxIy \\ \sum IxIy & \sum I_y^2 \end{bmatrix} \begin{bmatrix} \Delta Vx \\ \Delta Vy \end{bmatrix} = - \begin{bmatrix} \sum IxIt \\ \sum IyIt \end{bmatrix}$$

At step 416, the flow field V is updated to add $\Delta Vx$ and $\Delta Vy$. At step 418, i is incremented by 1 and control proceeds to the top at step 404 for the next subsequent iteration until the maximum number has been performed.

The spatial and temporal derivatives may be determined using techniques known to those in the art as described, for example, in B. K. P Horn's text book, "Robot Vision." It should be noted that in the forgoing, the spatial derivative may be characterized as the difference between neighboring pixel intensity and the temporal derivative may be characterized as the difference between two sequential images, I1 and I2. For robustness in one embodiment, the images may be blurred using a Gaussian filter before obtaining the difference. It should also be noted that the quantities represented by $\Delta$ Vx and $\Delta$ Vxy determined at step 414 and used at step 416 in connection with updating the flow field vector V represent an adjustment to the flow field when using a next level in the pyramid. Using the pyramiding technique as described herein in an embodiment provides for taking into account the differences in images I1 and I2 where the amount of motion or the motion disparity may be characterized as a relatively large amount.

The following should be noted regarding the additional symbols referenced herein:

Ix, Iy, and It $\in R^{w \times h}$; and

Figure 6B:
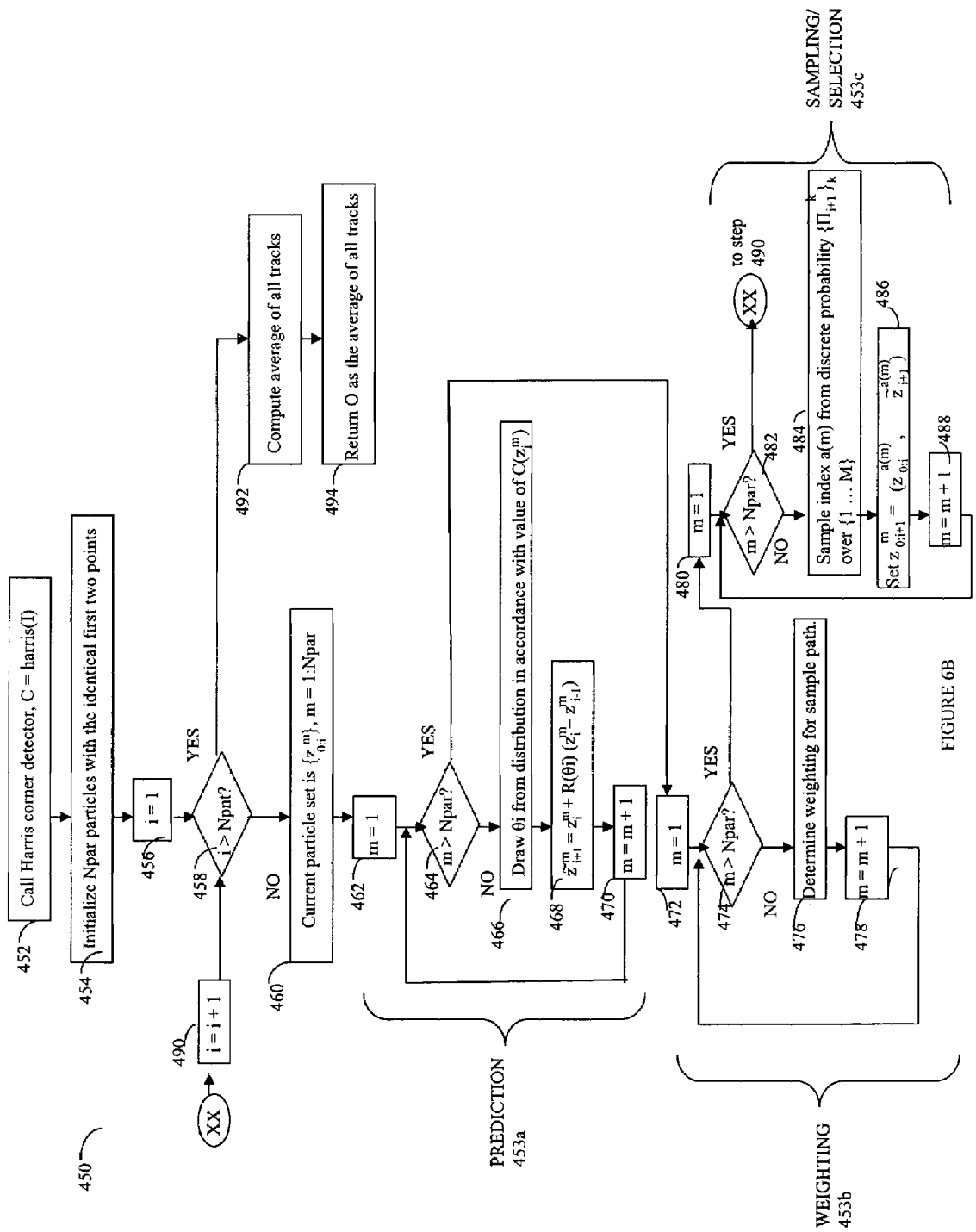
FIG. 6B is a flowchart of processing steps of one embodiment of the JetStream tracking technique.

V and $\Delta V \in R^{w \times h \times 2}$, and $\Delta$ Vx and $\Delta$ Vy $\in R^{w \times h \times 2}$ Referring now to FIG. 6B, shown is a flowchart 450 of processing steps that may be performed in one embodiment of a JetStream tracking algorithm. It should be noted that the processing steps of flowchart 450 present more detail of the JetStream technique as used in one embodiment of step 208 of FIG. 4B. It should be noted that the following variables are referenced herein in connection with describing details of an embodiment of the JetStream tracking technique of flowchart 450:

O=JetStream tracking (I, zo, dz, Npnt, Npar, s)

The order of the foregoing parameters above maps to the parameters specified at step 208 of FIG. 4B for each particular invocation, where:

O is the list of points determined by the JetStream technique;

I is the input image;

zo is a 2-dimensional starting point (x,y);

dz is the starting direction;

Npnt is the number of points to track;

Npar is the number of particles in the tracking; and s is the step length.

The flowchart 450 is one embodiment of the JetStream algorithm as described, for example, in JetStream: Probabilistic Contour Extraction with Particles, Patrick Perez, Andrew Blake, and Michel Gangnet, *International Conference on Computer Vision*, p. 524-531, July 2001. Recall that the JetStream tracking technique grows paths or tracings from the specified starting point, zo. Successive points are added to each path by sampling over a probability distribution to estimate the most probable next point or position in a path based on prior dynamics. Steps of flowchart 450 are performed to predict or propose a next point to be added to each path by sampling from a proposal density function forming sample paths. These sample paths are then weighted producing a set of resulting weighted paths. The resulting weighted path set may be used to provide an approximation of the target distribution. The approximation is used in the sampling or selection process in which Npar paths are drawn with replacement from the previous set of resulting weighted paths. An embodiment may use different techniques in estimating the best path. The embodiment described in connection with flowchart 450 of FIG. 6B estimates the best path to be the mean or average path. An embodiment may also estimate the best path to be the path of maximum weight.

One embodiment of the foregoing as illustrated in flowchart 450 begins at step 452 where a Harris corner detector may be used to determine, for each pixel position in the image I, whether the pixel is a corner or not. The Harris corner detection technique is described, for example, in C. Harris and M. Stephens, A Combined Corner and Edge Detector, *Proceedings of the 4th Alvey Vision Conference*, pages 147-152, 1988. In one embodiment, publicly available code may be used such as located and described, for example, at http://www.csse.uwa.edu.au/~pk/Research/MatlabFns/index.html. In the embodiment described herein, the Harris corner detector indicates a value of 1 if a particular pixel is determined to be at a corner, and a zero otherwise. These values are used in prediction processing steps described in following text. At step 454, the Npar particles or paths are initialized with identical first two points as follows:

$$z_0^m = z_0; z_1^m = z_0 + dz \cdot s, m=1, \ldots Npar$$

Processing steps are performed for determining each of the next Npnt points for each path. At step 456, i=1. At step 458, a determination is made as to whether all points have been determined. If not, control proceeds to step 460 where the current particle set is represented as $$\{z_{0:i}^m\}, m=1:Npar$$

Steps for prediction processing are performed for each of the Npar paths. At step 462, m=1. At step 464, a determination is made as to whether prediction processing has been performed for all paths. If so, control proceeds to step 472 to begin weighting processing. Otherwise, control proceeds to step 466 where a direction change, $\theta i$, is drawn from a distribution in accordance with whether the current path is at a corner or not. A uniform distribution on $(-\pi/2, +\pi/2)$ is used for drawing $\theta i$ for a path m if $C(z_{0:i}^m)=1$ indicating a corner. Otherwise, if $C(z_{0:i}^m)=0$, then $\theta i$ is drawn from a normal distribution, $N(0, \sigma_\theta^2)$. Control proceeds to step 468 to determine or predict:

$$\tilde{x}_{i+1}^m = \tilde{x}_i^m + R(\theta i)(\tilde{x}_i^m - \tilde{x}_{i-1}^m)$$

Control proceeds to step 470 where m is incremented by 1 to continue processing with the next path.

At step 464, when a determination is made that m is greater than Npar, control proceeds to step 472 where weighting processing is performed. At step 472, m=1. At step 474, a determination is made as to whether all paths have been processed (if m>Npar). If so control proceeds to step 480 for sampling or selection processing described in more detail below. Otherwise, control proceeds to step 476 to determine a weighting for the current sample path. The weighting may be represented as:

$$\prod_{i+1}^{m} = \frac{Kq(\theta i)l(\nabla(\tilde{x}_{i+1}^m), c(\tilde{x}_{i+1}^m))}{\frac{c(x_i^m)}{\Pi} + (1 - c(x_i^m))N(\theta i; 0, d\sigma_\theta^2)}$$

where:

K is a normalization factor such that $$\sum_{k=1}^{M} \prod_{i+1}^{k} = 1;$$

l is a point-wise likelihood ratio;

q denotes the prior angular density on direction change θi;
σ_θ denotes standard deviation;
$\sigma_\theta^2$ denotes standard deviation; and
d denotes the step value used (Note: the step value is also denoted as "s" elsewhere).

Control proceeds to step 478 where m is incremented by 1 and control proceeds to step 474 to continue processing with the next path.

When weighting processing has been performed for all paths, control proceeds from step 474 to step 480 to begin sampling or selection processing. At step 480, m=1. At step 482, a determination is made as to whether all paths have been processed. If so, control proceeds to step 490 to continue processing with the next point. Otherwise, control proceeds to step 484 to sample index a(m) from the discrete probability $\{\Pi_{i+1}^k\}_k$ over $\{1 \ldots Npar\}$.

At step 486, the following is determined:

$$x_{0:i+1}^m = (x_{0:i}^{a(m)}, \tilde{x}_{i+1}^{a(m)})$$

Control proceeds to step 488 where m is incremented. At step 482, sampling or selection processing continues until all paths have been processed.

When selection processing is complete, control proceeds from step 482 to step 490 where i is incremented by 1. At step 458, processing continues with the next point, denoted by i, until i>Npnt. When i>than Npnt, control proceeds to step 492 to compute the average for all tracks. Step 492 processing may be represented as performing the following for each point i, where i ranges from 1 to Npnt indicating the number of points or length of each path:

$$z_i = 1/Npar \sum_{m=1}^{Npar} z_i^m$$

At step 494, the set of points is returned as O where:

$$O = \{z_i\}, i=1:Npnt$$

In connection with processing described herein, sampling from discrete and Guassian or normal distributions is described, for example, in W. Press, S. Teukolsky, W. Vetterling, and B. Flannery, *Numerical Recipes in C*, Cambridge University Press, Second Edition, 1995.

It should be noted that an embodiment may use other techniques than those described herein in connection with determining static image cues and motion cues. Additionally, an embodiment may use other techniques besides those described herein in connection with tracking an occluding contour. For example, an embodiment may use techniques described in Amnon Shaashua and Shimon Ullman, "Structural Saliency", ICCV 1988, p. 321-327, and William Freeman, "Steerable Filters and Local Analysis of Image Structure", PhD Thesis, MIT, 1992, as alternatives to the JetStream tracking technique described herein.

The foregoing description produces a single set of contour information using two images. However, the foregoing techniques may be used in an embodiment which produces more than one set of contour points for the same scene using more than two images. For example, a first set of contour points may be determined for an original image and a second image at a second point in time. A second set of contour points may also be determined using the original image and a third image at yet a later point in time. In the foregoing example, all three images are different images captured of a same scene at three different points in time. The final contour information stored in connection with the original first image may be represented as the set union of all of the contour points determined for each pair of images. It should be noted that an embodiment may combine boundary points produced from multiple instances using other techniques than as described herein.

The occluding contour information produced in the foregoing may be a list of pixel locations or contour points. It should also be noted that the various pixel locations may also be represented in other forms known to those of ordinary skill in the art such as those that may be determined by a curve fitting of the contour points. The occluding contour information retained may be a list of occluding contour points, stored alone or in combination with, a formulaic representation of the points as produced from curve fitting.

As described herein, the occluding contour information may be used in connection with a variety of different photographic enhancements, and more generally, image editing and enhancements for both in-camera and off-camera processing. The occluding contour information may be used in connection with both interactive as well as non-interactive image editing and enhancements as known to those of ordinary skill in the art.

Occluding contour information may be used, for example, in removing flash shadow artifacts. A camera flash strobe is offset from a camera lens. This offset may cause black shadow lines outside object edges in flash photographs. It may be difficult for an image processing program to reliably remove such artifacts from an image. Knowing the locations of the occluding edges or contours using the occluding contour information produced using the techniques described herein may be used to automatically identify and remove such flash shadow artifacts. Techniques for automatically identifying and removing flash shadow artifacts are known in the art as described, for example, in *Flash Photography Enhancement Via Intrinsic Relighting*, http://graphics.csail.mit.edu/~fredo/PUBLI/flash/flash.pdf, Elmar Eisemann and Frédo Durand, SIGGRAPH 2004; Georg Petschnigg, Maneesh Agrawala, Hugues Hoppe, Richard Szeliski, Michael Cohen, Kentaro Toyama. *Digital Photography with Flash and No-Flash Image Pairs*. ACM Transactions on Graphics (Proceedings of SIGGRAPH 2004), 2004, http://research.microsoft.com/copyright/accept.asp?path=http://research.microsoft.com/projects/FlashNoFlash/flash_no_flash%20(web).pdf&pub=acm; and *Non-photorealistic Camera: Depth Edge Detection and Stylized Rendering Using a Multi-Flash Camera*

Ramesh Raskar (Mitsubishi Electric Research Labs), Karhan Tan (University of Illinois at Urbana-Champaign), Rogerio Feris (University of California, Santa Barbara), Jingyi Yu (Massachusetts Institute of Technology), Matthew Turk (University of California, Santa Barbara) ftp://ftp.merl.com/pub/raskar/NPR/.

The occluding contour information may also be used in connection with object-based image editing. As an example, a software image editing application may be used to edit an image. A user may select an object by clicking on the particular object using a mouse or other selection device. The user may then cut and paste the object, edit the selected object, or move the object within the existing image. The occluding contour information produced herein may be used by such software applications in object-based image editing to define object boundaries. The occluding contour information may be used to provide for defining object regions automatically.

The occluding contour information may be used alone, or in combination with, other information provided, for example, through user interaction where a user manually specifies such contour information.

In connection with image enhancement, an image editing program may use the information produced by the occluding contour detection techniques described herein to identify the outlines of objects allowing reliable estimation of the background and foreground objects. This may be used to provide for a variety of automatic image enhancement effects such as, for example:

1. slightly blurring only the background while keeping the foreground sharp focusing attention on foreground objects;
2. accentuating the local contrast across occluding contours providing for locally adaptive sharpening operation making objects appear to stand out in relief,
3. selectively making foreground colors more saturated to also accentuate the apparent depth of a photograph.

The foregoing are some image enhancement techniques using the occluding contour information that may be performed known to those of ordinary skill in the art. As another example, color saturation may be increased as described in http://documents.wolfram.com/applications/digitalimage/UsersGuide/3.6.html by converting to an HSV image, boosting the S (saturation) channel, and then converting back to an RGB image. Techniques known for color saturation and other image enhancement techniques that may use the occluding contour information are known in the art as described, for example, in the text book *Digital Image Processing, Second Edition*, Rafael C. Gonzalez, Richard E. Woods, Copyright: 2002.

The foregoing are some operations that are currently performed manually but may be performed automatically using the occluding contour information as described herein.

The occluding contour information produced using the techniques described herein may also be used for in-camera exposure control. Camera manufacturers may use statistical training data to identify the optimum exposure for a given photograph. Having occluding contour information may be useful in providing a compact summary of an image indicating foreground objects and the layer relationships providing clues to where people are and what is the main subject of the picture. This additional information may be used in techniques for improving exposure and flash control. The occluding contour information may be used, for example, to identify the occluding edges in an image to provide statistical information used to help identify the main subject of a photograph. Such techniques for processing and/or enhancing the image are known in the art. One such example is set forth in EP Patent No. 1215626, and related U.S. Pat. No. 6,654,507, which is incorporated by reference herein, and US Publication No. 2002/114535 for U.S. patent application Ser. No. 09/736,825, which is also incorporated by reference herein, assigned to Kodak As another example, following is how occluding contour information may be used to determine a proper camera exposure. An occluding contour in the approximate shape of a person's silhouette may be used to provide evidence that a person was in a particular location in the image, and give an approximate indication of their size. The foregoing may indicate that an element at that location in the image and distance from the camera may be the main subject in the scene, and that the exposure should be adjusted to have that person properly exposed by the flash from the camera. How to identify objects based on the shapes of their outlines is known in the art as described, for example, in S. Sclaroff and A. P. Pentland, "*Modal matching for correspondence and recognition,*" IEEE Trans. Pattern Anal. Machine Intell., vol. 17, pp. 545-561, July 1995.

The foregoing are just some example uses and applications of the contour information produced using the techniques described herein. Other techniques and uses for the occluding contour information are known to those of ordinary skill in the art.

Figure 9:
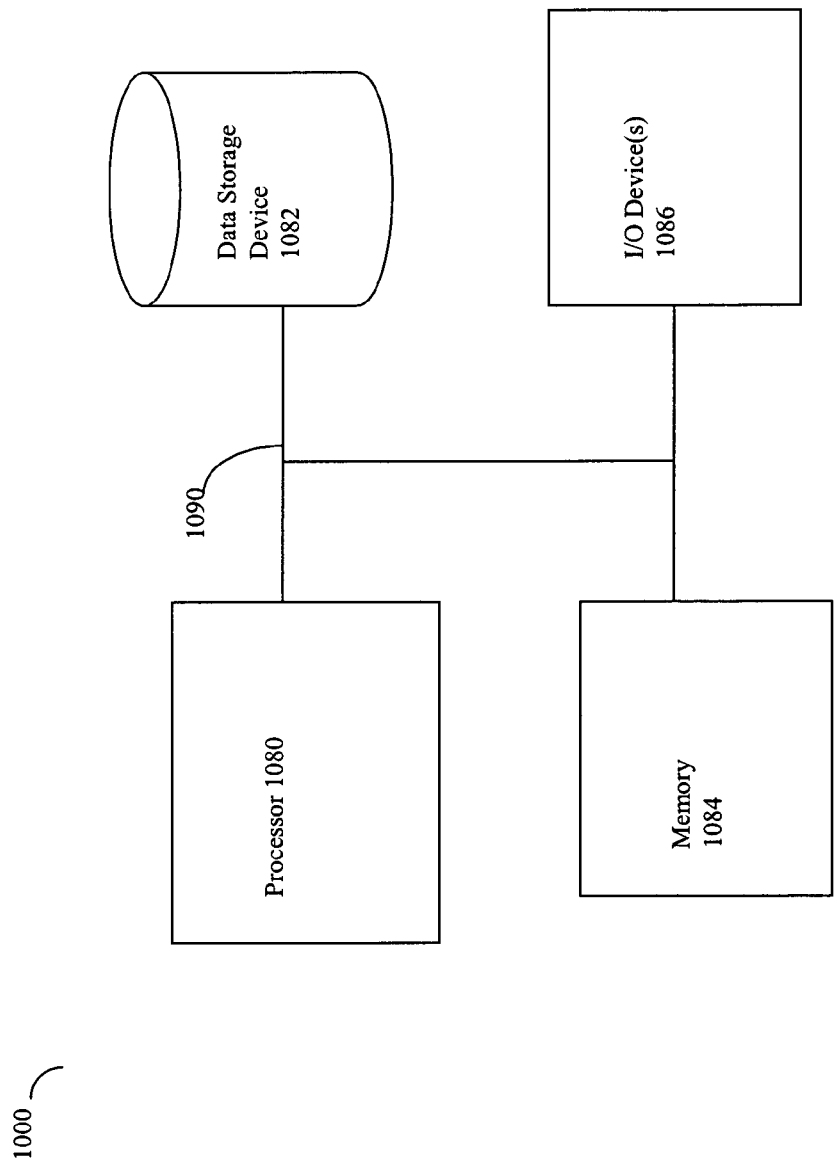
FIG. 9 is an example of an embodiment of components that may be included in a computer system performing image processing techniques described herein.

Referring now to FIG. 9, shown is an example of an embodiment of a computer system 1000. It should be noted that although a particular configuration of a computer system 1000 is described herein, an embodiment may have any one of a variety of different configurations including different hardware and/or software components. Included in this embodiment of the computer system 1000 is a processor 1080, a memory, 1084, one or more I/O devices 1086 and one or more data storage devices 1082 that may be accessed locally within the particular host system. The data storage devices 1082 may include a single device, such as a disk drive, as well as a plurality of devices in a more complex configuration, such as with a storage area network and the like. Data may be stored, for example, on magnetic, optical, or silicon-based media. Each of the foregoing may communicate using a bus or other communication medium 1090. Each of the foregoing components may be any one or more of a variety of different types in accordance with the particular computer system 1000.

Each of the processors included in the computer system 1000 may be any one of a variety of proprietary or commercially available single or multi-processor system, such as an Intel-compatible x86 processor, an IBM mainframe or other type of commercially available or proprietary processor, able to support processing in accordance with each particular embodiment and application. Instructions and data may also be stored on a data storage device 1082, ROM, or other form of media or storage.

An embodiment may use the computer system 1000 to perform processing of resultant image data after still images, such as a photographs, and occluding contour information have been initially captured by the digital camera as described herein. Such processing may include, for example, performing additional image enhancements, and/or image editing techniques using the image data and occluding contour information previously obtained using the digital camera as described herein.

In another embodiment, rather than use a digital camera to perform the image capturing and processing techniques, the computer system 1000 may be used in connection with performing some or all of the image capturing and processing techniques described herein. Instructions may be loaded into memory 1084 and executed by processor 1080 to perform processing steps described herein. An embodiment may use the computer system 1000 including a portable PC camera as one of the I/O devices 1086, for example, as the image capturing device. An embodiment may use the portable PC camera to obtain one or more sets of image data. The one or more sets of image data may be stored in a first format on one of the data storage devices 1082 of the computer system 1000. Subsequently, code may be executed by the processor 1080 to perform some or all of the image processing steps (such as the occluding contour detection) on the sets of image data previously described as being performed, for example, by the image processing circuit. In particular, the processor 1080 may perform the occluding contour detection processing steps as described herein, in whole or in part, as well as other image processing techniques known to those of ordinary skill in the art. For example, in another embodiment, a digital camera may be used to capture the images of a scene. The associated image data may be uploaded to a computer system as illustrated in FIG. 9 to perform the previously described in-camera processing of the image data determining occluding contours. Image capture and processing steps described herein, as well as others known to those of ordinary skill in the art, may be partitioned among the image capturing device and/or the computer system 1000. The particular partitioning may vary in accordance with each embodiment.

What will now be described are example images and processing results applied to those images using the techniques described herein.

Figure 10:
FIGS. 10 and 11 are example images of a scene taken at different points in time.
Figure 11:
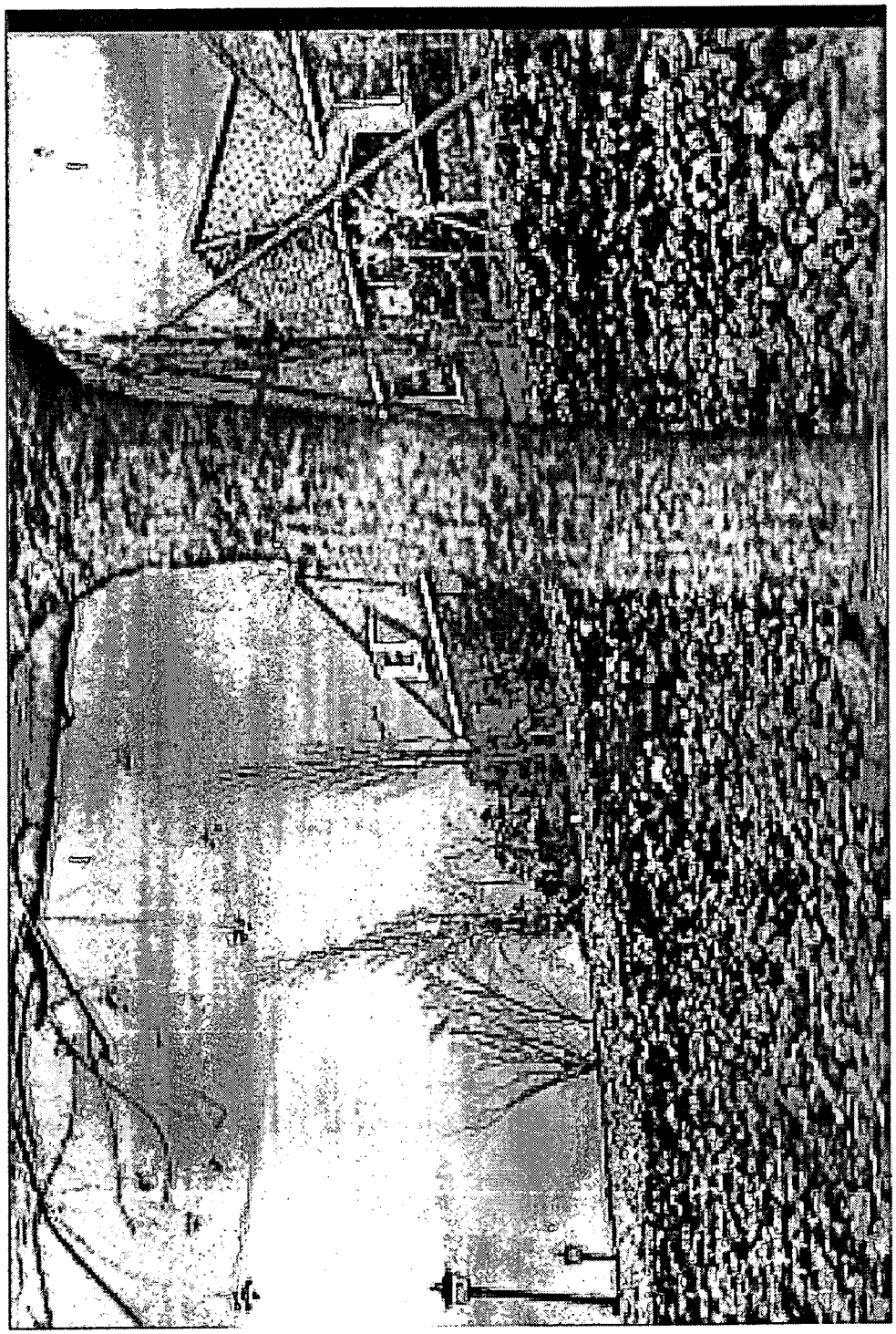
Figure 12:
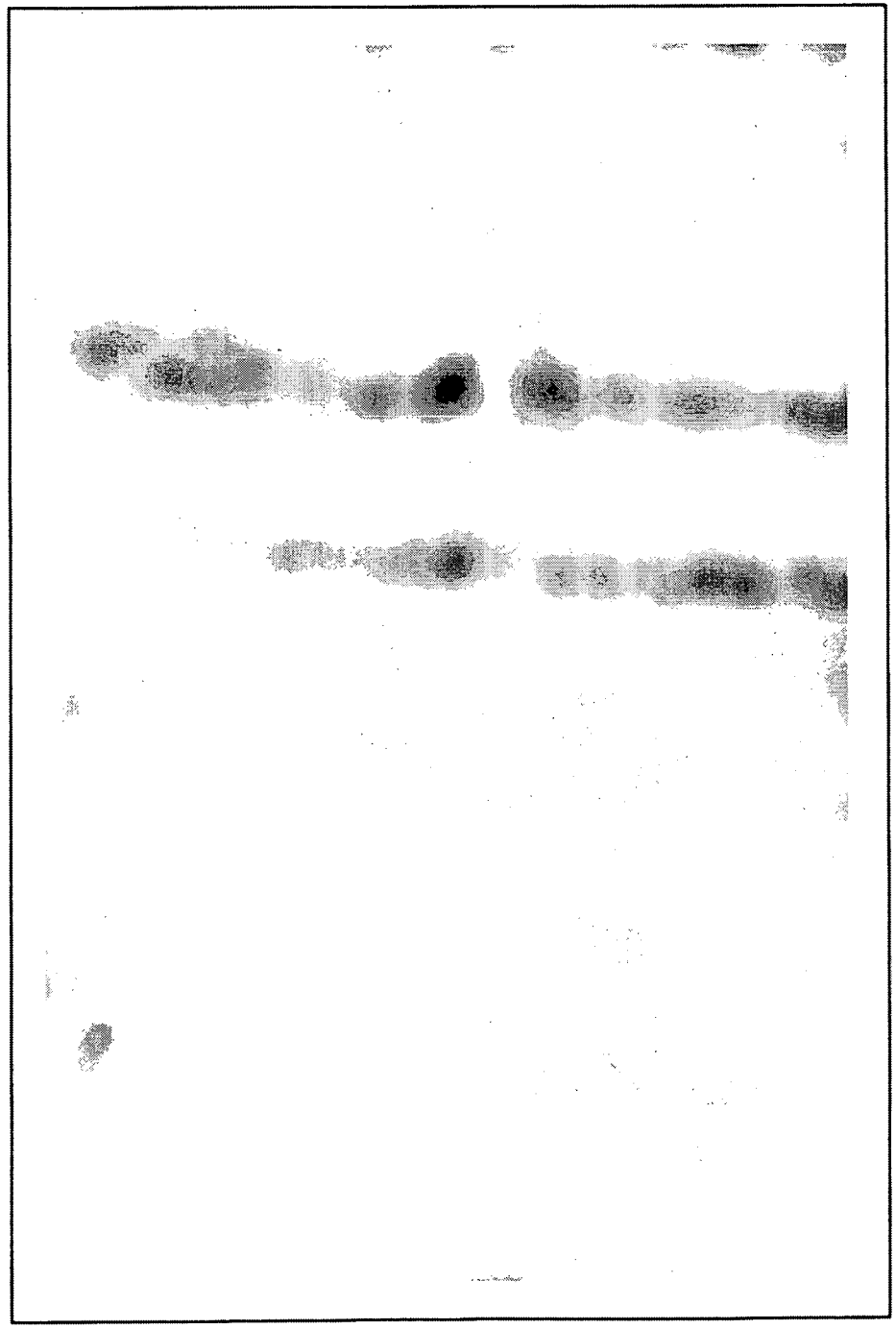
FIGS. 12-15 are examples of processing data in connection with the images of FIGS. 10 and 11 in accordance with techniques described herein.
Figure 13:
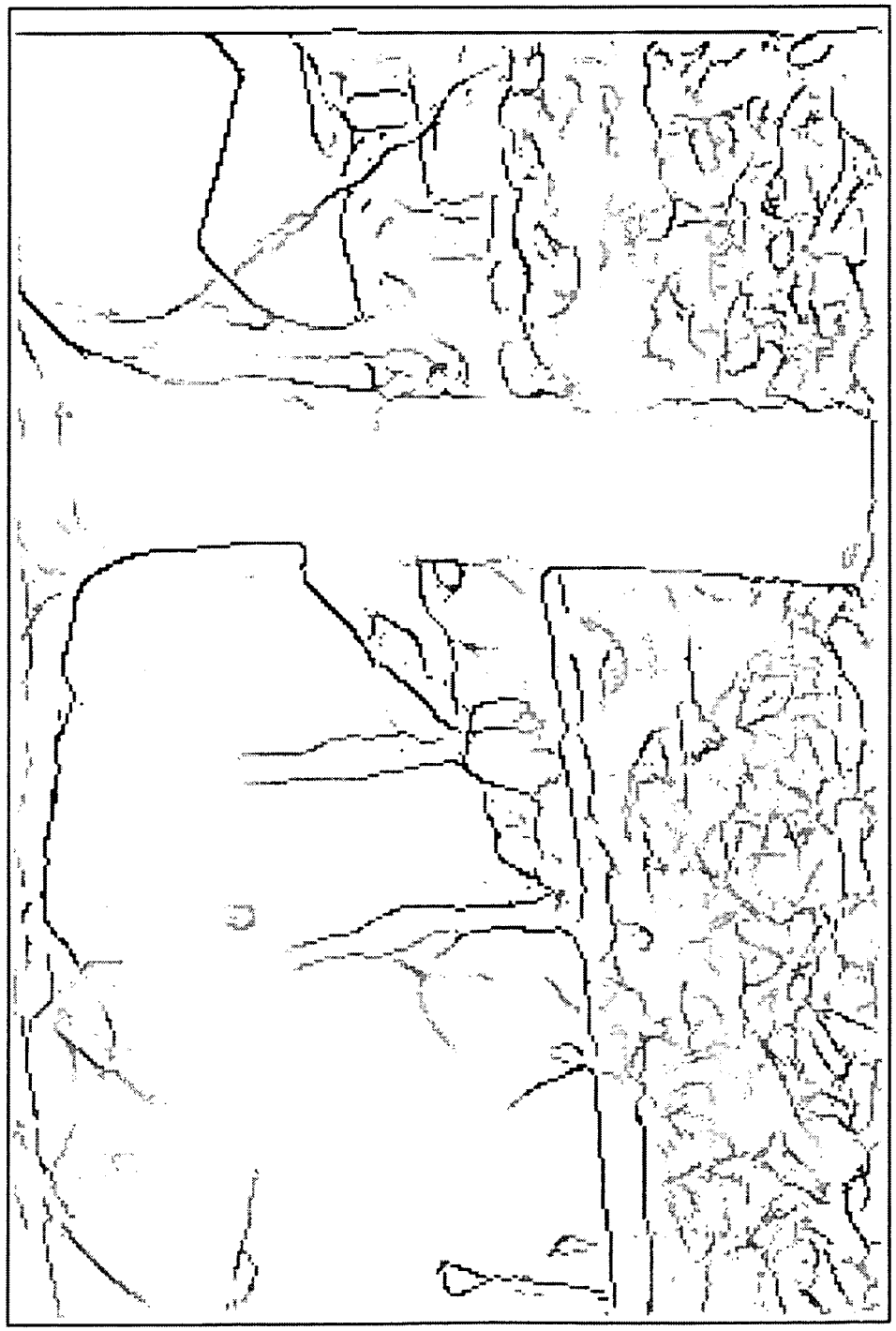
Figure 14:
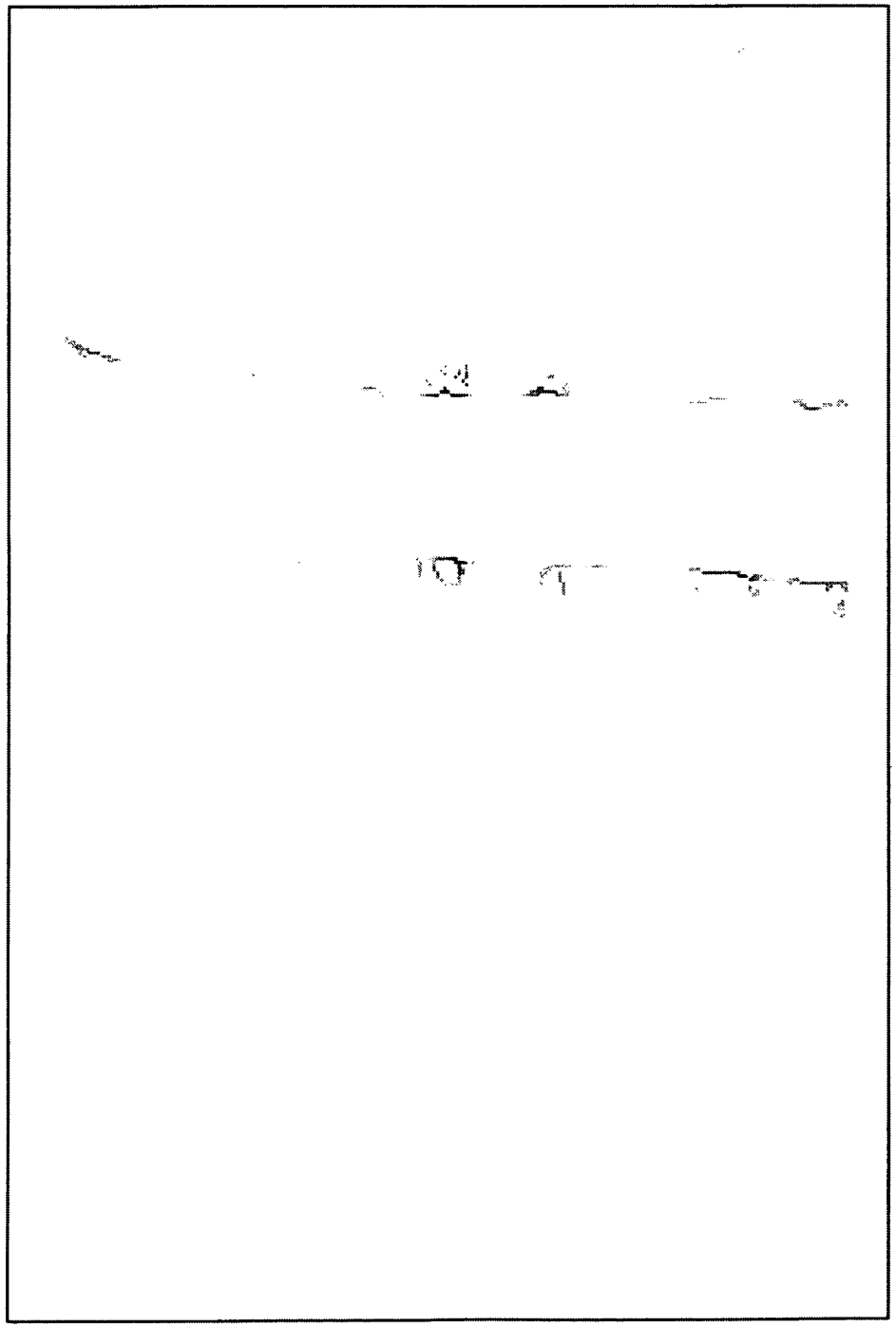
Figure 15:
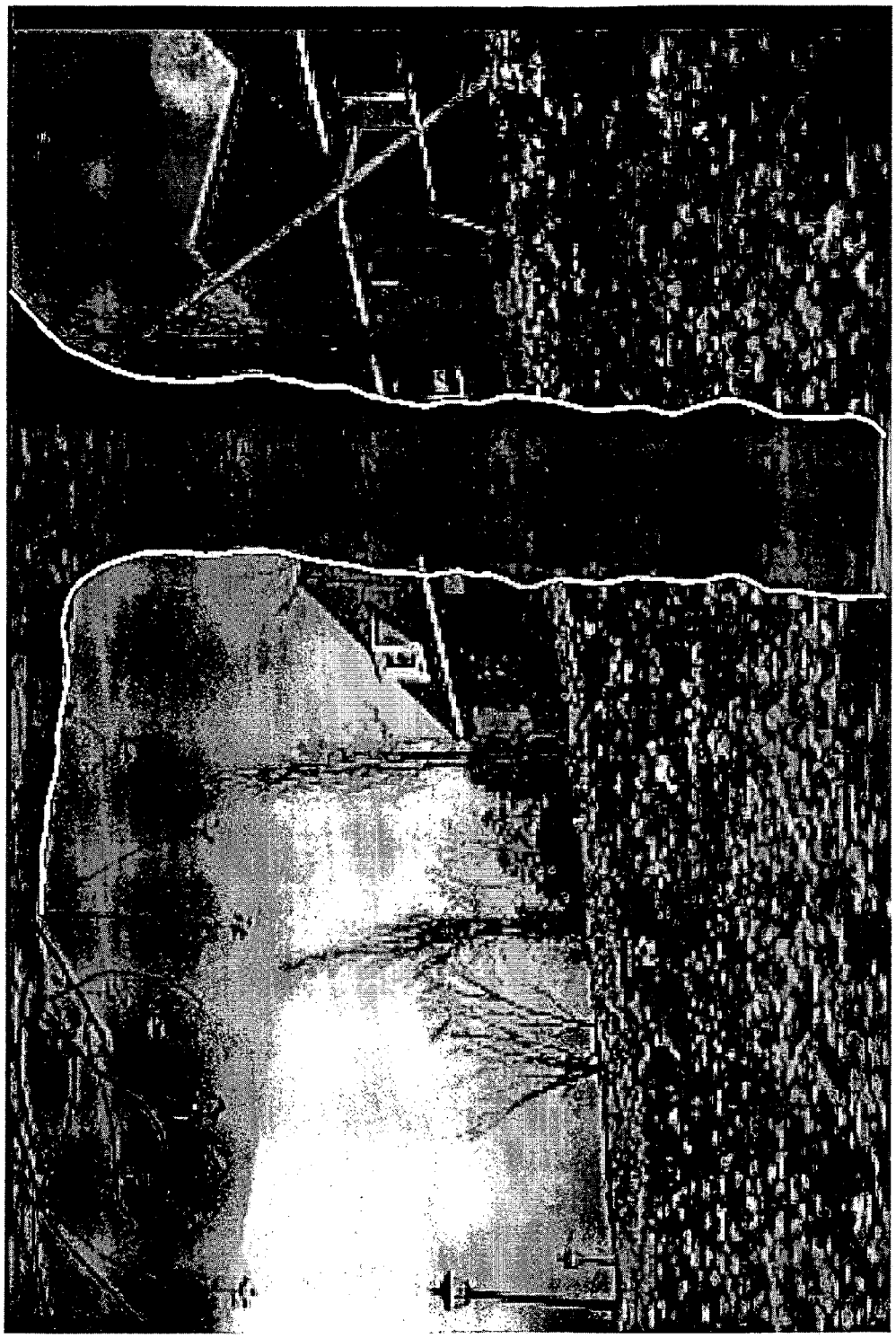

Referring now to FIGS. 10 and 11, shown are example first and second images captured of a same scene at two points in time. The image 1200 of FIGS. 10 and 1220 of FIG. 11 may be processed using the techniques described herein. FIG. 12 may represent an example image 1300 corresponding to the disparity map. FIG. 13 may represent an image 1320 of the static image boundaries determined by the Berkeley algorithm. FIG. 14 may represent an image 1400 of the product of images 1300 and 1320. The image 1400 represents an example of occluding contour candidates considered by the JetStream tracking algorithm. FIG. 15 represents an image 1420 of the occluding contours (white lines) tracked by the JetStream algorithm. In connection with processing the foregoing images using the techniques described herein, an embodiment may use the following example values:

L=3, n=2, s=3, Npnt=200, Npar=400, and $\theta=0.10\|Po\|^2$, where Po is the initial probability map, P, and $\|Po\|^2$ is the sum of the squared values of the initial map, P.

Other embodiments may use different values than as described herein and these are provided for purposes of illustration of the images herein.

It should be noted that the occluding contour detection processing described herein may be performed using uncompressed image data. After performing the occluding contour processing, an embodiment may compress the image data. An embodiment may also compress the representation of the occluding contour information determined. The occluding contours information may be compressed using any one or more different techniques know to those of ordinary skill in the art. For example, an image may be created with the occluding contour points marked as white, or with their computed probability of being an occluding contour. The remainder of the image pixels may be marked as black. Any one of variety of different compression techniques may then be applied to this image. Alternatively, an embodiment may enumerate and encode the contours with some contour compression technique such as, for example, chain coding.

Although the techniques described herein are illustrating using two-dimensional data, an embodiment may also use data with a different number of dimensions.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining and using information about occluding contours comprising:
   using a processor to perform the following steps of:
   receiving a first image and a second image of a same scene at different points in time;
   determining motion disparity between said first image and said second image;
   determining static image information about said first image, said static image information including an orientation map for said first image wherein the orientation map includes an angular measurement for each pixel in said first image representing an orientation of a boundary through said each pixel;
   determining occluding contour information of said first image using said motion disparity and said static image information; and
   using said occluding contour information in connection with performing an operation resulting in modification of image data.

2. The method of claim 1, further comprising:
   storing said occluding contour information with said first image.

3. The method of claim 2, wherein said occluding contour information includes a plurality of points corresponding to pixel locations of said first image.

4. The method of claim 2, wherein said occluding contour information includes an equation produced by a curve fitting process in accordance with a plurality of occluding contour points.

5. The method of claim 2, wherein said operation is included in processing performed in connection with at least one of: image enhancement or image editing.

6. The method of claim 2, wherein said occluding contour information is used in performing a non-interactive image operation on said first image.

7. The method of claim 2, wherein said occluding contour information is used in performing an interactive image operation in said first image.

8. A method for determining occluding contours comprising:
   using a processor to perform the following steps of:
   receiving a first image and a second image of a same scene at different points in time;
   determining motion disparity between said first image and said second image;
   determining static image information about said first image; and
   determining occluding contour information of said first image using said motion disparity and said static image information, wherein the method further comprises:
   combining said static image information and said motion disparity into a product; and
   tracking occluding contours of said product to produce said occluding contour information.

9. The method of claim 1, further comprising:
   determining a flow field representing the motion disparity between said first image and said second image;
   warping said second image in accordance with said flow field to a warped image; and
   determining a disparity map by comparing said warped image with said first image.

10. The method of claim 1, wherein said static information includes at least one of: color, texture and brightness.

11. The method of claim 8, further comprising:
    determining a pixel in said product having a maximum intensity;
    using said pixel as a starting point to track a contour;
    removing said contour from said product producing a remaining product; and
    repetitively determining other contours from said remaining product until a threshold intensity of said product is reached.

12. The method of claim 11, further comprising:
  determining a plurality of paths from said starting point; and
  determining said contour in accordance with an average of said plurality of paths.

13. The method of claim 1, further comprising:
  receiving a second set of occluding contour information determined using a third image of said same scene;
  determining final occluding contour information by combining said occluding contour with said second set of occluding contour information; and
  storing said final occluding contour information with said first image.

14. A camera comprising:
  a first component that receives a first image and a second image of a same scene at different points in time;
  a second component that determines occluding contour information of said first image using motion disparity between said first image and said second image and static image information about said first image, said static image information including an orientation map for said first image wherein the orientation map includes an angular measurement for each pixel in said first image representing an orientation of a boundary through said each pixel;
  a third component that stores said occluding contour information with said first image; and
  a fourth component that uses said occluding contour information to automatically perform an operation resulting in modification of image data stored in a memory.

15. The camera of claim 14, wherein said operation performed by said fourth component is processing performed in connection with an image enhancement.

16. A computer readable memory comprising code stored thereon for determining and using information about occluding contours, the computer readable medium comprising code that:
  receives a first image and a second image of a same scene at different points in time;
  determines motion disparity between said first image and said second image;
  determines static image information about said first image, said static image information including an orientation map for said first image wherein the orientation map includes an angular measurement for each pixel in said first image representing an orientation of a boundary through said each pixel;
  determines occluding contour information of said first image using said motion disparity and said static image information; and
  using said occluding contour information in connection with performing an operation resulting in modification of image data.

17. The computer readable medium of claim 16, further comprising code that stores said occluding contour information with said first image.

18. The computer readable medium of claim 17, wherein said occluding contour information includes an equation produced by a curve fitting process in accordance with a plurality of occluding contour points.

19. The computer readable medium of claim 17, wherein said operation is included in processing performed in connection with at least one of: image enhancement or image editing.

20. The computer readable medium of claim 16, further comprising code that:
  determines a flow field representing the motion disparity between said first image and said second image;
  warps said second image in accordance with said flow field to a warped image; and
  determines a disparity map by comparing said warped image with said first image.

21. The method of claim 1, wherein said operation is automatically performed by executing code without user interaction.

22. The method of claim 1, wherein performing said operation includes automatically identifying and removing flash shadow artifacts from said image data.

23. The method of claim 1, further comprising:
  receiving a first user selection of an object having boundaries determined in accordance with said occluding contour information; and
  receiving one or more other user selections causing said operation to be performed, wherein said operation is one of: editing the object to modify the object as included in said image data, performing a cut operation to remove the object from said image data, performing a paste operation to add the object to said image data, and moving the object within said image data.

24. The method of claim 1, wherein performing said operation includes performing color saturation.

25. The method of claim 1, wherein said occluding contour information is used to identify foreground objects and background objects, and performing said operation includes performing at least one of: blurring said background objects and increasing saturation of foreground colors to accentuate apparent depth.

26. The method of claim 1, wherein said occluding contour information is used in connection with determining a proper camera exposure.

27. The method of claim 26, wherein said occluding contour information is used in identifying a main subject in said scene and selecting a camera exposure, wherein said selecting is performed in accordance with a distance of the main subject from the camera.

28. The method of claim 1, wherein said static image information includes a static cue boundary map including an entry for each pixel in said first image indicating a probability as to whether said each pixel is on an occluding contour based on one or more static image cues.

29. The method of claim 1, wherein said one or more static image cues include color, texture, and brightness.

* * * * *